US012718549B2

(12) United States Patent
Walt, II et al.

(10) Patent No.: US 12,718,549 B2
(45) Date of Patent: Aug. 25, 2026

(54) SYSTEM AND METHOD OF OBJECT DETECTION USING AI DEEP LEARNING

(71) Applicant: QC Hero, Inc., Chicago, IL (US)

(72) Inventors: Michael A. Walt, II, Chicago, IL (US); Edmund Emerson Rosewright, Chicago, IL (US)

(73) Assignee: QC Hero, Inc., Chicago, IL (US)

( * ) Notice: Subject to any disclaimer, the term of this patent is extended or adjusted under 35 U.S.C. 154(b) by 0 days.

(21) Appl. No.: 19/098,180

(22) Filed: Apr. 2, 2025

(65) Prior Publication Data

US 2025/0232573 A1 Jul. 17, 2025

Related U.S. Application Data

(63) Continuation of application No. 17/634,355, filed as application No. PCT/US2020/045720 on Aug. 11, 2020, now Pat. No. 12,288,390.

(Continued)

(51) Int. Cl.

*G06V 10/82* (2022.01)
*B23Q 17/20* (2006.01)

(Continued)

(52) U.S. Cl.

CPC ............ *G06V 10/82* (2022.01); *B23Q 17/20* (2013.01); *B25J 9/1697* (2013.01); *B25J 13/08* (2013.01);

(Continued)

(58) Field of Classification Search

CPC .... G06V 10/82; G06V 10/7747; G06V 20/70; G06V 10/95; B23Q 17/20; B25J 9/1697;

(Continued)

(56) References Cited

U.S. PATENT DOCUMENTS 5,911,003 A 6/1999 Sones
6,546,125 B1 4/2003 Su (Continued)

FOREIGN PATENT DOCUMENTS

CN 104850858 A 8/2015
CN 108038847 A 5/2018
CN 208118364 U 11/2018

OTHER PUBLICATIONS

Solomon, Solvision, Dec. 27, 2018, https://www.youtube.com/watch?v=XOk_zcK5AxA.

(Continued)

*Primary Examiner* — Jay Khandpur

(74) *Attorney, Agent, or Firm* — Levenfeld Pearlstein, LLC

(57) ABSTRACT

A system for object detection of a manufactured part. The system comprises a system controller electronically coupled to an image acquisition device and delivery mechanism. An electronically stored ordered object detection map is provided which comprises predetermined detectable objects associated with the manufactured part. The ordered object detection map is generated from output created by execution of a trained object detection model and by processing such output according to predetermined calibration criteria. The system causing a visual image of the manufactured part to be captured with image data being extracted and processed to render at least one of a pass determination and a fail determination. The system being configured to process the manufactured based upon the rendered pass/fail determination.

10 Claims, 26 Drawing Sheets

Related U.S. Application Data

(60) Provisional application No. 62/885,716, filed on Aug. 12, 2019.

(51) Int. Cl.

| | |
|---|---|
| ***B25J 9/16*** | (2006.01) |
| ***B25J 13/08*** | (2006.01) |
| ***G01N 21/84*** | (2006.01) |
| ***G01N 21/88*** | (2006.01) |
| ***G01N 21/93*** | (2006.01) |
| ***G05B 19/05*** | (2006.01) |
| ***G06T 7/00*** | (2017.01) |
| ***G06V 10/774*** | (2022.01) |
| ***G06V 10/94*** | (2022.01) |
| ***G06V 20/70*** | (2022.01) |

(52) U.S. Cl.

CPC ......... *G01N 21/8851* (2013.01); *G01N 21/93* (2013.01); *G05B 19/054* (2013.01); *G06T 7/0004* (2013.01); *G06V 10/7747* (2022.01); *G06V 10/95* (2022.01); *G06V 20/70* (2022.01); *G01N 2021/8411* (2013.01); *G01N 2021/8887* (2013.01); *G05B 2219/1105* (2013.01); *G06T 2207/30164* (2013.01)

(58) Field of Classification Search

CPC ..... B25J 13/08; G01N 21/8851; G01N 21/93; G01N 2021/8411; G01N 2021/8887; G05B 19/054; G05B 2219/1105; G06T 7/0004; G06T 2207/30164

See application file for complete search history.

(56) References Cited

U.S. PATENT DOCUMENTS

| | | | | |
|---|---|---|---|---|
| 9,347,432 | B2 | 5/2016 | Herrig et al. | |
| 10,181,185 | B2 | 1/2019 | Park et al. | |
| 10,365,639 | B2 | 7/2019 | Ghadar et al. | |
| 10,543,942 | B2 | 1/2020 | Almogy et al. | |
| 10,664,722 | B1 | 5/2020 | Sharma et al. | |
| 10,789,701 | B2 | 9/2020 | Weiss et al. | |
| 10,916,005 | B2 | 2/2021 | Avrahami et al. | |
| 10,930,037 | B2 | 2/2021 | Namiki et al. | |
| 11,282,229 | B2 | 3/2022 | Oota et al. | |
| 2003/0228051 | A1 | 12/2003 | Gleason et al. | |
| 2006/0029257 | A1 | 2/2006 | Eguchi et al. | |
| 2014/0130613 | A1* | 5/2014 | Adiga ..................... | G01N 1/06 73/864.41 |
| 2016/0148850 | A1 | 5/2016 | David | |
| 2017/0212829 | A1 | 7/2017 | Bales et al. | |
| 2018/0225828 | A1 | 8/2018 | Guo et al. | |
| 2018/0353348 | A1 | 12/2018 | Kawka et al. | |
| 2019/0080446 | A1 | 3/2019 | Kuzmin et al. | |
| 2019/0096135 | A1 | 3/2019 | Dal Mutto et al. | |
| 2019/0114756 | A1 | 4/2019 | Weiss et al. | |
| 2019/0126487 | A1 | 5/2019 | Benaim et al. | |
| 2020/0005422 | A1 | 1/2020 | Subramanian et al. | |
| 2021/0166374 | A1 | 6/2021 | Banno et al. | |

OTHER PUBLICATIONS

Solomon, Solvision Conducts defect and pattern inspections through the power of AI, Dec. 27, 2018, https://www.solomon-3d.com/solomon-vision/.

Solomon, Solvision A simpler approach to address machine vision problems, Solvision Catalogue, Dec. 27, 2018, https://iptech1.com/wp-content/uploads/2019/01/Solvision-Catalogue.pdf.

Floydhub, Using Deep Learning and TensorFlow Object Detection API for Corrosion Detection and Localization, May 16, 2019, https://blog.floydhub.com/localize-and-detect-corrosion-with-tensorflow-object-detection-api/.

International Search Report issued by ISA/US in connection with PCT/US20/45720 dated Oct. 4, 2020.

Written Opinion issued by ISA/US in connection with PCT/US20/45720 dated Oct. 4, 2020.

IPRP issued by WIPO in connection with PCT/US2020/045720 dated Feb. 24, 2022, 8 pages.

* cited by examiner

TO FIG. 3C CONTINUED

| Id | StateName | StepName | ResultsGUID | DisplayName | |
|---|---|---|---|---|---|
| 5810047 | Determine Side | Copy of Vision Assistant 1 | PASS/FAIL | Step Status | A |
| 5810048 | Determine Side | Match Pattern 1 | PASS/FAIL | Step Status | B |
| 5810049 | Determine Side | Match Pattern 1 | NUM_OBJECT | # Matches | C |
| 5810050 | Determine Side | Match Pattern 1 | X | Match [%d].X Position (Pixel) | D |
| 5810051 | Determine Side | Match Pattern 1 | Y | Match [%d].X Position (Pixel) | E |
| 5810052 | Determine Side | Match Pattern 1 | ANGLE | Match [%d].Angle (degrees) | F |
| 5810053 | Determine Side | Match Pattern 1 | SCORE | Match [%d].Score | G |
| 5810054 | Determine Side | Set Coordinate System 1 | PASS/FAIL | Step Status | H |
| 5810055 | Determine Side | Match Pattern 2 | PASS/FAIL | Step Status | I |
| 5810056 | Determine Side | Match Pattern 2 | NUM_OBJECT | # Matches | J |
| 5810057 | Determine Side | Match Pattern 2 | X | Match [%d].X Position (Pixel) | K |
| 5810058 | Determine Side | Match Pattern 2 | Y | Match [%d].X Position (Pixel) | L |
| 5810059 | Determine Side | Match Pattern 2 | ANGLE | Match [%d].Angle (degrees) | M |
| 5810060 | Determine Side | Match Pattern 2 | SCORE | Match [%d].Score | N |
| 5810061 | Determine Side | Set Coordinate System 2 | PASS/FAIL | Step Status | O |
| 5810062 | Determine Side | Copy Inspection Status 1 | PASS/FAIL | Step Status | P |
| 5810063 | Feature1-1 | Match Pattern 1 | PASS/FAIL | Step Status | Q |
| 5810064 | Feature1-1 | Match Pattern 1 | NUM_OBJECT | # Matches | R |
| 5810065 | Feature1-1 | Match Pattern 1 | X | Match [%d].X Position (Pixel) | S |
| 5810066 | Feature1-1 | Match Pattern 1 | Y | Match [%d].X Position (Pixel) | T |
| 5810067 | Feature1-1 | Match Pattern 1 | ANGLE | Match [%d].Angle (degrees) | U |
| 5810068 | Feature1-1 | Match Pattern 1 | SCORE | Match [%d].Score | V |
| 5810069 | Feature1-1 | Set Coordinate System 1 | PASS/FAIL | Step Status | W |

FIG. 12C

| | MeasurementType | Units | Result | Measurement | ImageId |
|---|---|---|---|---|---|
| A | Pass Fail | | Pass | 0.000000,, | 16367 |
| B | Pass Fail | | Fail | 0.000000,# Matches | 16367 |
| C | # of Matches | | None | 0 | 16367 |
| D | X Position (Pix.) | pix | None | | 16367 |
| E | Y Position (Pix.) | pix | None | | 16367 |
| F | Angle | | None | | 16367 |
| G | Score | | None | | 16367 |
| H | Pass Fail | | Fail | 0.000000,,Ref. Point | 16367 |
| I | Pass Fail | | Pass | 0.000000,# Matches | 16367 |
| J | # of Matches | | None | 1 | 16367 |
| K | X Position (Pix.) | pix | None | 477.133789 | 16367 |
| L | Y Position (Pix.) | pix | None | 1248.386597 | 16367 |
| M | Angle | | None | 0 | 16367 |
| N | Score | | None | 975.91449 | 16367 |
| O | Pass Fail | | Pass | 1.000000,, | 16367 |
| P | Pass Fail | | Pass | 0.000000,Inspection | 16367 |
| Q | Pass Fail | | Pass | 1.000000,# Matches | 16367 |
| R | # of Matches | | None | 1 | 16367 |
| S | X Position (Pix.) | pix | None | 2132.059082 | 16367 |
| T | Y Position (Pix.) | pix | None | 670.485779 | 16367 |
| U | Angle | | None | 0.907776 | 16367 |
| V | Score | | None | 872.821472 | 16367 |
| W | Pass Fail | | Pass | 1.000000,, | 16367 |

FIG. 12C
Continued

SYSTEM AND METHOD OF OBJECT DETECTION USING AI DEEP LEARNING

CROSS-REFERENCE TO RELATED APPLICATION

The present application is a continuation application and claims priority to and the benefit of the filing date of U.S. patent application Ser. No. 17/634,355 filed on Feb. 10, 2022, now allowed, which was filed pursuant to 35 U.S.C. § 371 as a U.S. national stage application claiming priority to International Application No. PCT/US2020/0045720 filed on Aug. 11, 2020 which claims priority to U.S. Provisional Patent Application Ser. No. 62/885,716 filed on Aug. 12, 2019. These applications are hereby fully incorporated by reference in their entirety as if set forth fully herein.

FIELD

Embodiments presented herein relate generally to intelligent part or object examination and more particularly to systems and methods employing artificial intelligence ("AI") deep learning for examination of manufactured articles for identification of defects or irregularities from a calibration image.

BACKGROUND

Automated machine-enabled inspection is generally known as being an efficient and accurate means for examination of manufactured articles. Conventional machine vision systems are generally known to require an excessive amount of configuration and trial and error for object detection applications due to the need to first locate the object being detected and then develop a rule-based system for determining characteristics or properties representative of a bad (defective) or good (acceptable) object. In cases where the objects being detected can move around in the field of view, it is often not possible to reliably detect the object in the first place and therefore the quality of the object in that field of view. For these reasons, traditional machine vision for object detection is expensive due to the time involved in configuration and maintenance. So much so that widespread use will be limited until a better option is available.

New break throughs in deep learning have provided a means for reliable object detection anywhere in the field of view of an image. What is more, deep learning models, when trained, learn to detect objects under varied lighting anywhere in the field of view. Deep learning models based on neural networks can determine the best method for both locating and judging the quality of object in a time frame incomparable to human configuration. Furthermore, neural networks are capable of continued learning from the last checkpoint when new or changing conditions are discovered whereas traditional machine vision often requires complete reconfiguration and validation.

A number of different known systems are discussed as follows. First, CN104850858A is a published document which discloses an injection-molded product defect detection and recognition method. The contents of this reference is incorporated by reference into this patent application as if fully set forth herein. The system disclosed in this publication:

(1) uses a neural network that requires square images—this restricts the use of off the shelf cameras or requires image transformation prior to performing inspection increasing the overall cost of deployment; and (2) has no teaching of control to scrap rejected parts and is therefore not beneficial in production for quality control because it should require significant human intervention to sort rejected parts—which necessarily leads to large production delays and increasing overall waste.

The teachings of CN104850858A are specifically focused on the execution of a classification process for injection molding vision analysis and fail to provide specific teachings as to the implementation of processes or capabilities for handling the results of the classifier or object detector. Such teachings further do not take into account or consider the evolution of learning models over time and thus do not specifically address how output from an object detector or classifier can be used to improve manufacturing.

Second, CN208118364U is a published document which discloses an injection molding machine utilizing a mold-intelligent monitoring system. The contents of this reference is incorporated by reference into the present application as if fully set forth herein. In the system disclosed in this publication, image analysis is an ancillary part of the overall process of sorting good (acceptable) parts from bad (defective), and appears to be based on traditional machine vision using contrast to detect various defect conditions. While sometimes capable of defect detection, traditional machine vision is costly due to the need for a skilled person to configure and manage the system.

U.S. Pat. No. 6,546,125 discloses what it calls photolithography monitoring using a golden image. The contents of this patent are fully incorporated by reference as if fully set forth herein.

US Published Patent Application No. 20030228051 ("the '051 Publication") generally discloses a method for identification of anomalous structures. The contents of this publication are fully incorporated by reference into this application as if fully set forth herein. The '051 publication describes that the most common techniques used to detect defects in digital images are reference-based. It further teaches that reference-based techniques rely on a reference image of a defect-free object to be used as a means of comparison and that, in the reference-based technique, an image of a defect-free object is acquired, stored, and then used as a reference image. That reference image is sometimes referred to as a "golden image." Image processing techniques are used to detect the differences between the golden image and an image of a new object. The detected differences between the images are then labeled as defects.

US Published Patent Application No. 20180225828 ("the '828 Publication") generally discloses an image processing method and system. The contents of this publication are fully incorporated by reference into this application as if fully set forth herein. The '828 Publication discloses an image processing method that includes obtaining an image and selecting a calibration area of the image, reading a feature parameter corresponding to the calibration area from a preset segmentation model, and segmenting the image by using the feature parameter to generate a segmentation result corresponding to the calibration area. The '828 Publication further teaches that image segmentation through the use of the feature parameter obtained from the segmentation model provides a high accuracy segmentation rate and can be applied in wide scenarios.

Chinese Publication CN108038847 ("CN '847") discloses a deep learning-based transformer patrol image intelligent identification and fault detection system. The contents of this publication are fully incorporated by reference into this application as if fully set forth herein. This reference generally teaches the use of an object detection model to detect defects but only stores the results of the defect detection in a file system and is not used for control. The disclosed method could not be used to segregate parts in a production environment and further requires human intervention to inspect and sort the defect images after they are detected. CN ’847 also does not disclose or reasonably suggest real-time object detection, which would also be critical for a production environment. Instead, object detection is disclosed as a batched post-process long after image acquisition to enable a user to later review the defects found in the batch of processed images. The disclosed system also specifically requires the use of HDFS for a file storage system, and does not provide flexibility with regard to selection or implementation as to the type of file storage system used.

Non-patent literature at https://www.cognex.com/products/machine-vision/vision-software/visionpro-vidi (last accessed on Jul. 28, 2020) show and describe a ViDi system for deep learning-based software for industrial image analysis. The ViDi system generally consists of four modules: location, analysis, classification, and read text, that must be chained together to perform an inspection. The disclosed system requires a trained user to configure the system to deploy an inspection and does not provide for a simple process to train the expected order and position of the objects being detected. The system further runs from a standard computer with no input/output (“IO”) options. As such, it does not contain a programmable logic controller (“PLC”) that can be custom-programmed to handle IO and manufacturing execution system (“MES”) operations separate from analysis processing. Further, all aspects of the ViDi system that are described relate to a single part inspection whereas and do not discuss capability to detect multiple objects and multiple parts within the object.

From the following, persons of ordinary skill in the art will recognize that embodiments presented herein are directed to address the limitations and deficiencies of conventional machine vision systems.

BRIEF DESCRIPTION OF THE DRAWINGS

FIG. 12C is a table showing VBAI step results with exemplary data.

DETAILED DESCRIPTION

The following description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention.

Figure 1:
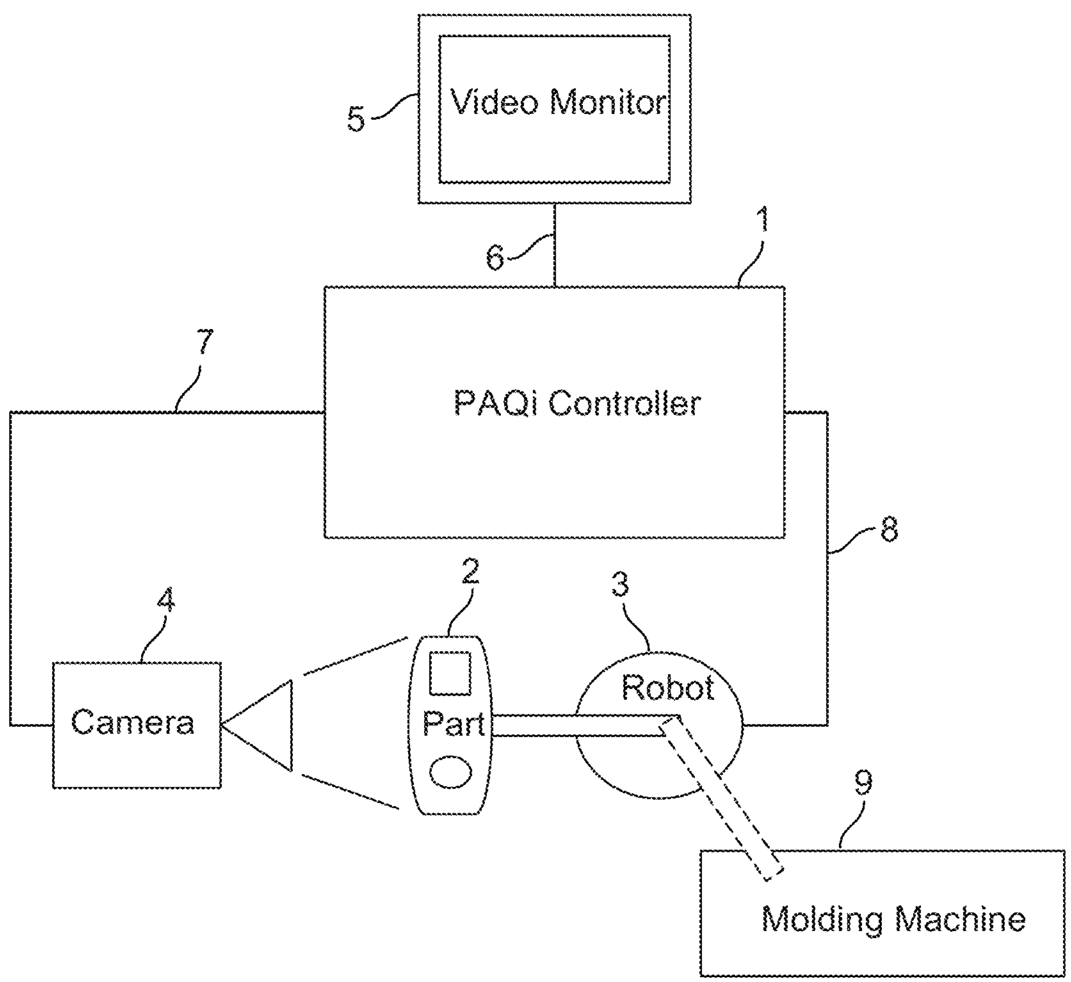
FIG. 1 is a schematic diagram of a system for inspecting manufactured parts according to exemplary embodiments.

Referring to FIG. 1, a schematic diagram of an exemplary system for detecting flaws in an injection molded part is shown. The system includes a system controller 1, named PAQi, that can be connected to one or more image capture devices such as cameras 4. According to exemplary embodiments shown schematically in FIG. 1, the connection between controller 1 and camera 4 can be made via cable 7. It will be understood however that such connection can also be made wirelessly via a wireless connection. According to exemplary embodiments, camera 4 can be configured to acquire images of the part under inspection 2.

As shown schematically in FIG. 1, the part under inspection 2 can be presented to camera 4 using a robot 3 or other known presentation mechanisms such as a conveyor assembly or other type of material handling fixture or system. According to exemplary embodiments, robot 3 can remove the part under inspection 2 from a manufacturing machine or other production equipment, such as for example, a molding machine 9. According to exemplary embodiments, the removal of the part 2 can trigger system controller 1 via digital IO or other industrial communications 8 and controller 1 can perform an inspection of part 2. Such results can be returned to robot 8 using connection 8 or other interface. An interface device such as a monitor 5 can be connected to the controller 1 and can be used to interface with the controller software to configure the system to teach the system to reliably recognize and differentiate a good (acceptable) part from a bad (defective) part. According to exemplary embodiments shown schematically in FIG. 1, the connection between controller 1 and video monitor 5 can be made via cable 6. It will be understood however that such connection can also be made wirelessly via a wireless connection. It will be understood that monitor 5 can be provided with touch screen capability and the ability to recognize and process touch input.

Figure 15B:
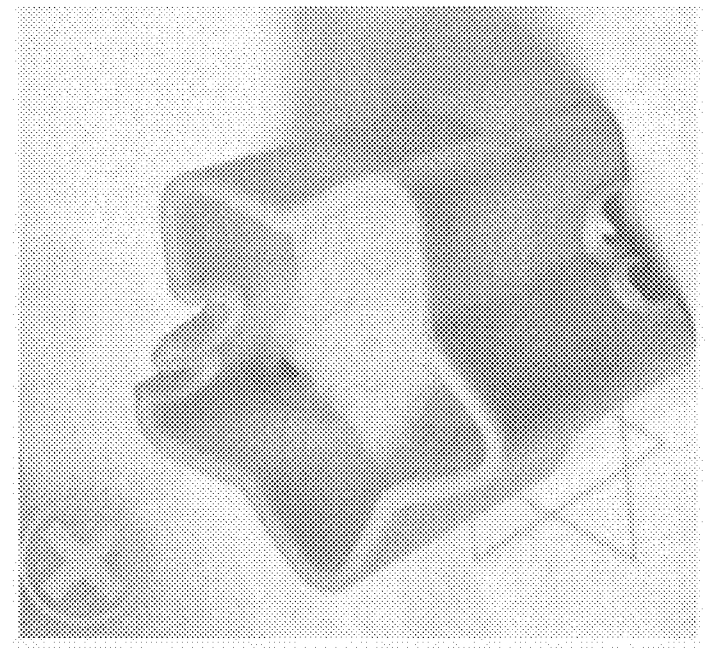
FIGS. 15A and 15B are perspective view images showing a representative production part in an acceptable and defective condition.
Figure 15A:
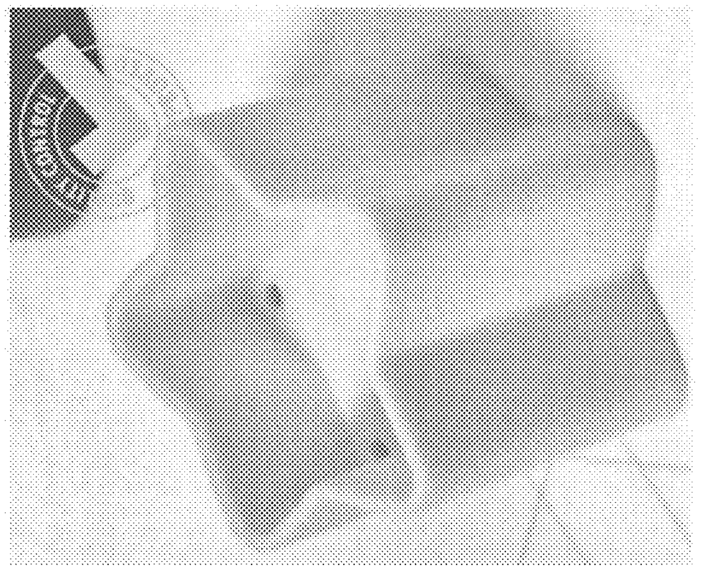

According to preferred embodiments presented herein, the system inspects the part 2 produced by the production machine 9 to detect and reject defects rather than properties of the molding machine itself. According to exemplary embodiments presented herein, the type of defects that can be detected include but are not limited to: short shots, flow lines, burn marks, warping, vacuum voids/air pockets, sink marks, weld lines, and jetting. FIGS. 15A and 15B representatively show examples of an acceptable part (FIG. 15A) and a defective part (FIG. 15B).

From the subject disclosure, persons of ordinary skill in the art will recognize that embodiments presented herein are able to automate conventional inspection processes and improve upon it by using a machine for classification to remove issues with human error and human judgement that can vary based on the skill level of different persons. Embodiments disclosed herein can further remove opinion and the effects of fatigue and stress from the human inspection process by relying on a machine to make consistent and reliable decisions based on deep learning.

Compared to prior art systems and methods, embodiments disclosed herein are less expensive to deploy and require less processing steps on account of not requiring configuration beyond the labeling of objects to detect. Embodiments presented herein, can drastically reduce the complexity, time, and expertise required to configure a superior object detector and/or classifier. Note that an object detector can be used to detect detects or the presence of wanted components for parts presence applications. Thus, an object detector incorporating or practicing embodiments disclosed herein is faster, more accurate, and more robust than the current state of the art.

Figure 2A:
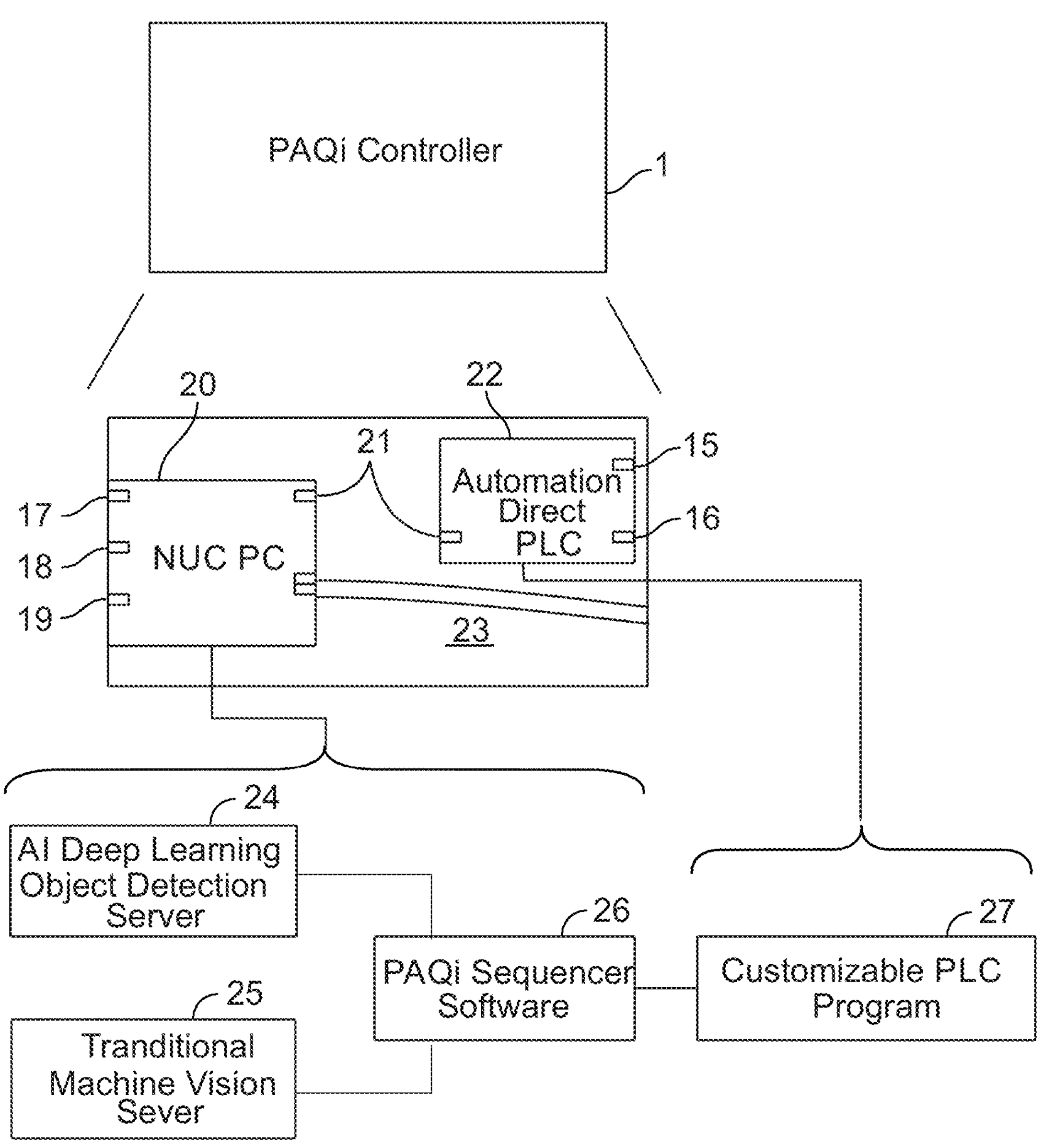
FIG. 2A is a schematic diagram showing components of the system controller and associated software components according to exemplary embodiments.

FIG. 2A illustrates components of an exemplary system controller 1 including a programmable processor such as an Intel NUC computer 20 can be provided and can include a microprocessor or microcontroller and processing circuitry. Computer 20 can also contain a Thunderbolt port 17 for optionally connecting the system controller 1 to an external graphics card to speed the time for vision analysis. According to exemplary embodiments shown schematically in FIG. 2A, computer 20 can contain ports 18 (such as USB3.0 ports) used to connect to peripheral devices such as mice, keyboards, barcode scanners, printers and cameras used for image acquisition. The computer 20 can also connect to the manufacturing Ethernet network via a LAN port 19 for transferring data onto the network and industrial communications with the robot, fixture, or conveyor to trigger the system and report the inspection results. The computer 20 can also contain a video display port 23 for connecting an external monitor to view the results of the inspection sequence.

As shown schematically in FIG. 2A, a transmission control protocol port such as for example a Modbus TCP port 15 can be provided and connected to the system's programable logic controller (PLC) 22 such as an AutomationDirect model CO-10DRE-D which can be configured for processing a PLC logic program 27 to process digital IO signals sent and received on the M12 port 16. According to exemplary embodiments, the PLC 22 can connect to the computer 20 via a serial communications link 21 to transfer the PLC IO state to process a sequence of operations.

As shown schematically in FIG. 2A, according to exemplary embodiments the system computer 22, can include a sequencing software program 26 that can be provided and configured to manage the sequence of operations to acquire images and process them for inspection purposes using either an AI-based deep learning TensorFlow Extended object detection server 24 and/or a traditional machine vision server 25 such as National Instruments' VBAI. According to exemplary embodiments, the system PLC 22 can host a PLC program 27 to send and receive signals to the robot, fixture, or conveyor to start the inspection sequence and report the results so that the robot, fixture, or conveyor knows when to remove a rejected part from production. Also, the system PLC 22 can have a customized PLC program 27 which allows for additional sequencing and station control for non-standard applications or where the overall manufacturing station contains no independent controller. This provides a means for utilizing PAQi as both the station controller and inspection system.

By using off the shelf hardware, the system according to embodiments presented herein is up to ⅕$^{th}$ the cost of traditional machine vision systems. In conjunction with the aforementioned human time savings, the system can provide a means for widespread use in general quality control applications previously only cost effective for critical quality control applications such as verifying the correct assembly of an automotive system air bag.

Also, the use of an open source deep learning server by the PAQi and models for inspection deployment presents a number of advantages when used. For example, the system is far less expensive than prior art fault detection systems because the server and models can be maintained and improved by the open source community that reduces the cost of the system be eliminating the need for a dedicated R&D team specializing in deep learning development.

Figure 2B:
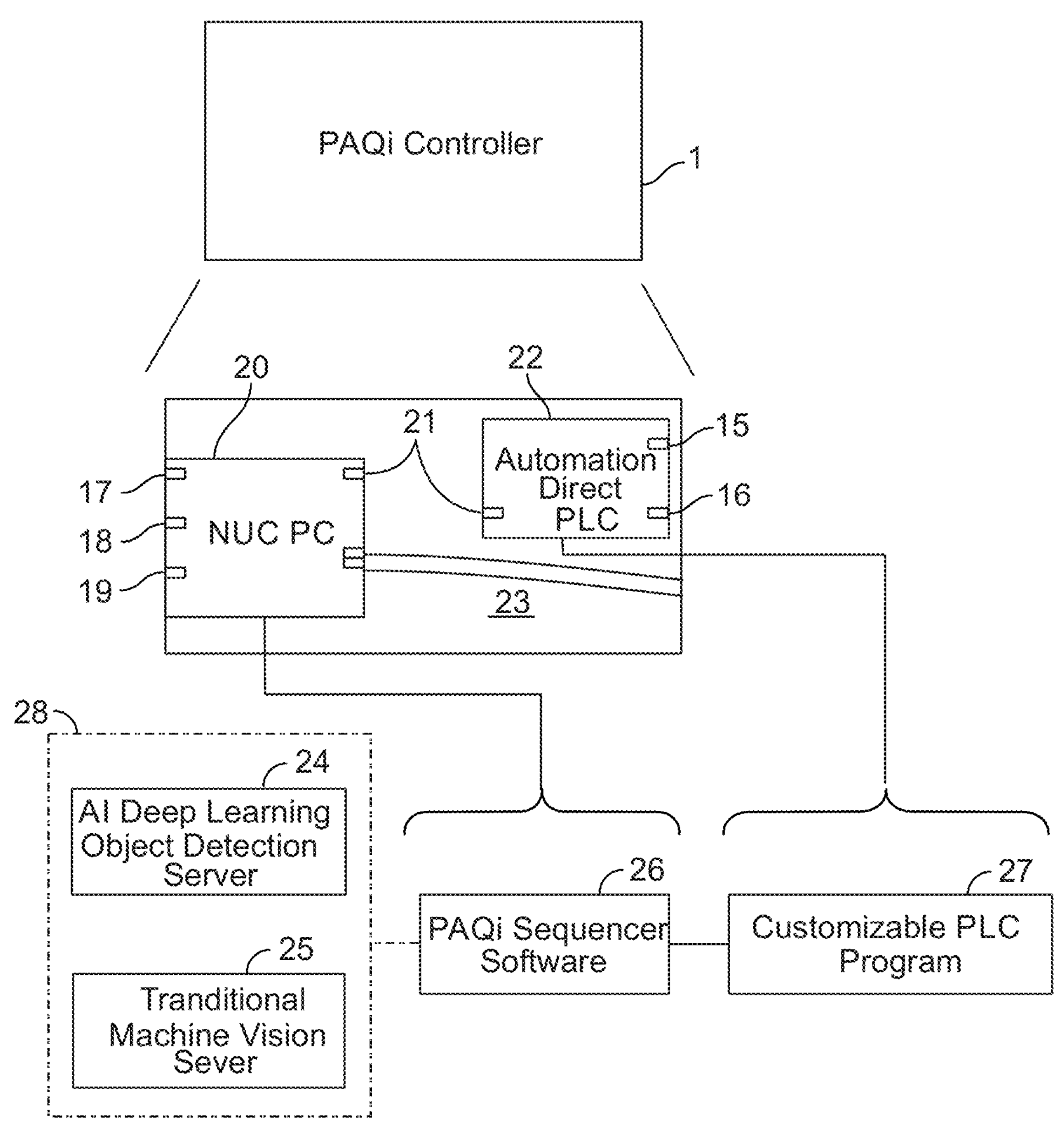
FIG. 2B is a schematic diagram showing components of the system controller and associated software components according to exemplary embodiments where vision analysis software resides on a networked computer.

FIG. 2B schematically illustrates a representative embodiment identical to the embodiment shown in FIG. 2A except with AI based deep learning object detection server 24 and/or a traditional machine vision server 25 residing on a network computer 28. According to exemplary embodiments shown schematically in FIG. 2B, the networked computer 28 can communicate with the vision analysis server 25 via TCP/IP based communications 29. Under this configuration, a more powerful computer can be used to process the analysis to save cycle time. Additionally, the centralized server can serve multiple PAQi systems to limit the management of trained models. For example, if multiple molding machines produce the same part, it may be beneficial to have one trained model server to serve both machines.

Thus, according to the exemplary embodiments illustrated schematically in FIG. 2A, the system can be designed to have two processors: an embedded computer 20 running the defect detection model and a PLC 22 for interfacing with industrial controls. In particular, the computer 20 can have the capability to handle the sequencing, image acquisition, image analysis, and storage, and the PLC 22 can be provided to handle the interface to the manufacturing system. The two processors can work in parallel to more efficiently perform defect detection in a manufacturing environment to segregate good parts from bad. Such a system can further give the neural network unprecedented and direct access to controls and is important for real-time defect detection in the context of a manufacturing environment.

Figure 3A:
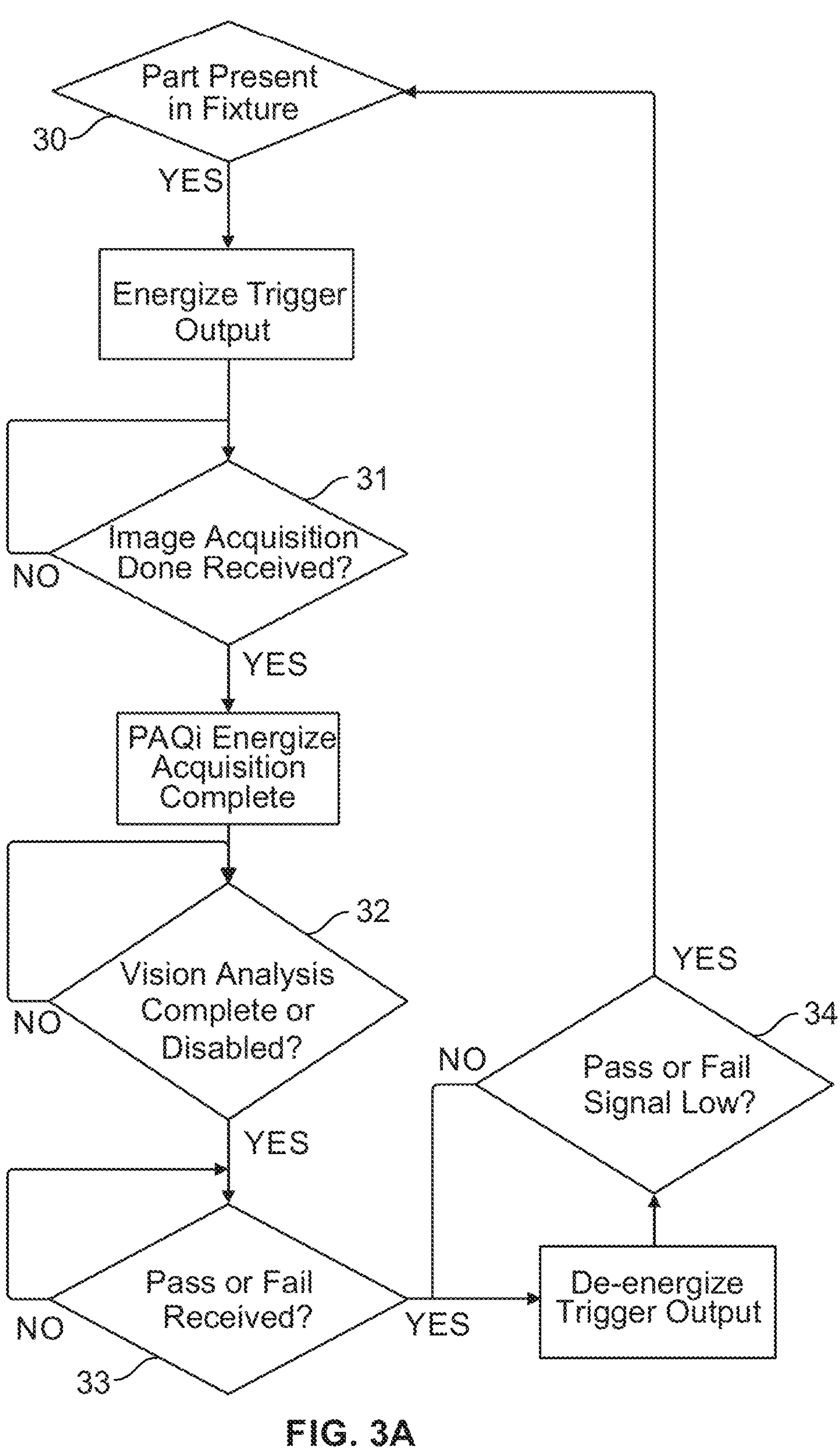
FIG. 3A is a flowchart showing an exemplary sequence of operations for inspecting parts on a fixture or conveyor according to one acquisition cycle.
Figure 3B:
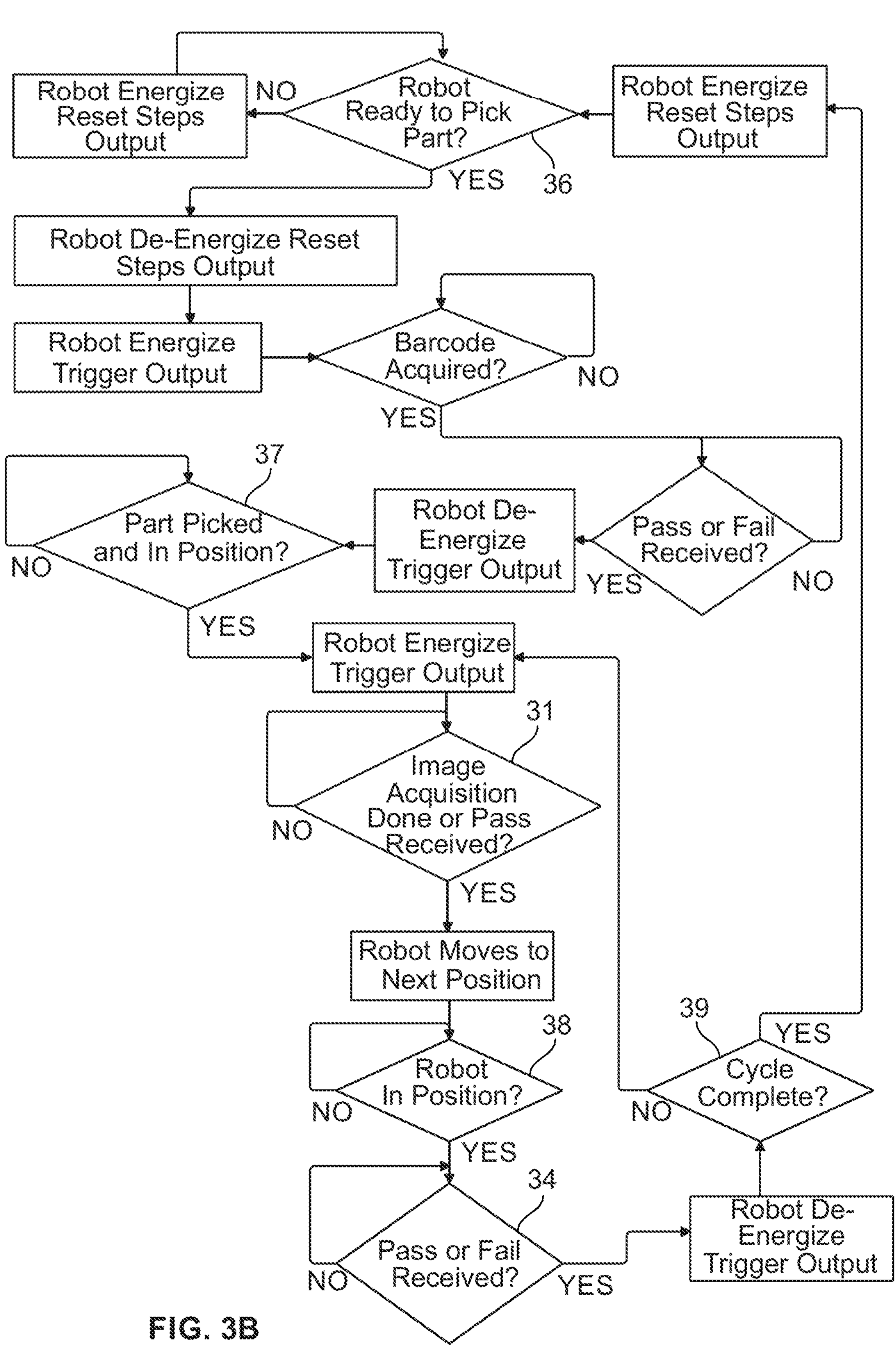
FIG. 3B is a flowchart showing an exemplary sequence of operations for inspecting parts presented by a robot where multiple acquisition and inspection cycles are conducted until the overall inspection is complete.

FIGS. 3A & 3B are flowcharts that graphically illustrate exemplary sequences of operations for overall operations, robotic operations, and fixed part operations. In FIG. 3A, the part being inspected is stationary on a fixture 30 or conveyor and only a single cycle is required to inspect the part. Inspection can be done using one or more cameras for image acquisition 31. In the event the system is configured for vision analysis 32 in addition to acquisition 31, the external system responsible for presenting the part to the camera 4, waits for analysis to complete and a pass or fail result 33 to be sent before de-energizing the acquisition trigger 34 before starting the cycle over.

In FIG. 3B, the part is removed from the molding or assembly machine using a robot 3 that attempt to pick up the part to be inspected 36 and presented in front of the camera 4 prior to trigging the acquisition 37 in multiple steps to inspect one or more parts in different orientations to ensure the entire part is inspected, since in many instances inspection can only be carried out on visible surfaces and objects. The robot can wait for the acquisition to complete 31 before moving the part to the next step and can retrigger the acquisition when in position 38 and after a pass or fail is received. This process repeats until the robot has positioned and triggered acquisition at all necessary position until the cycle is complete 39 at which time the process is repeated for the next part.

Figure 3C:
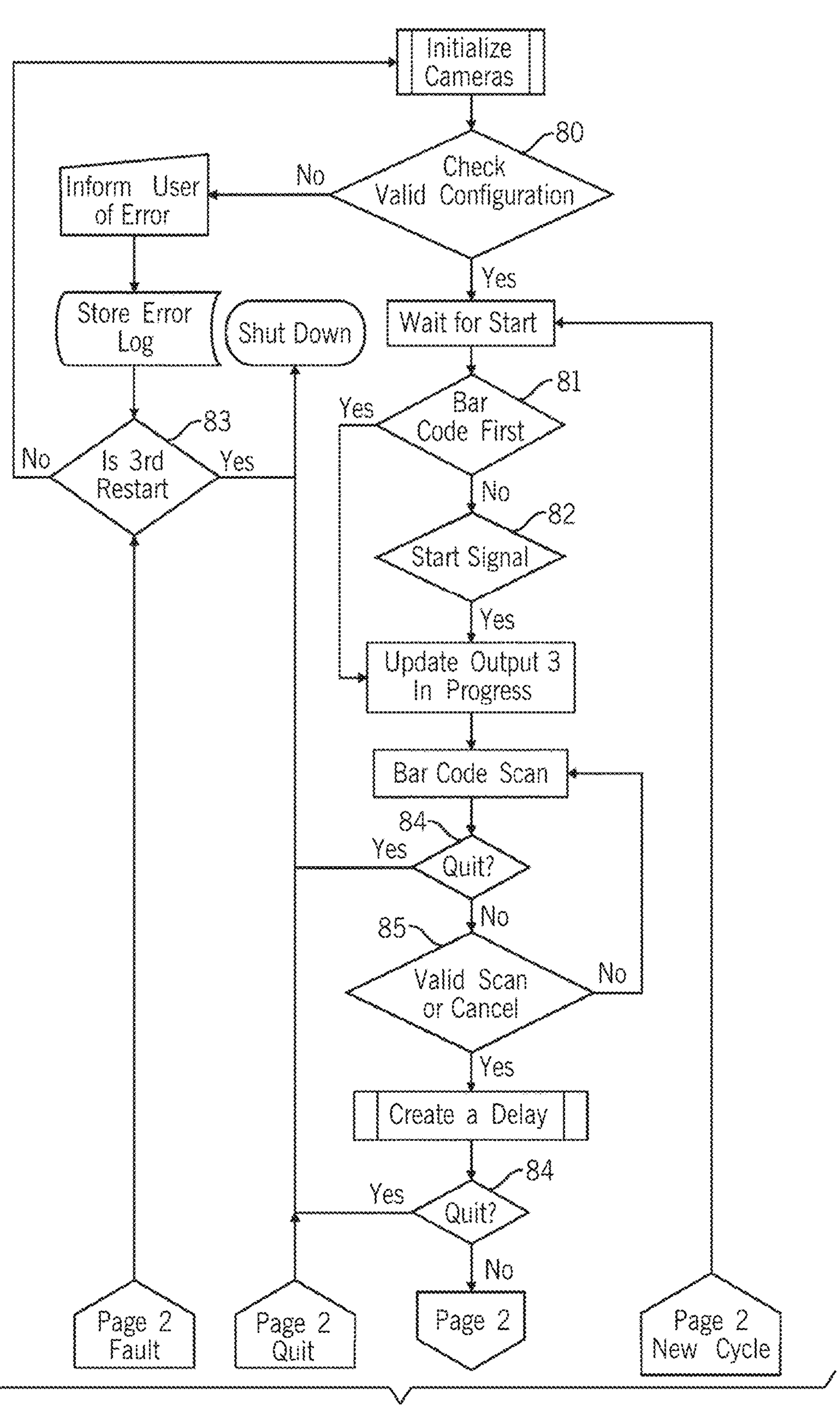
FIG. 3C is a flowchart showing an exemplary overall sequence of operations for the sequencing software according to an exemplary embodiment.
Figure 3C:
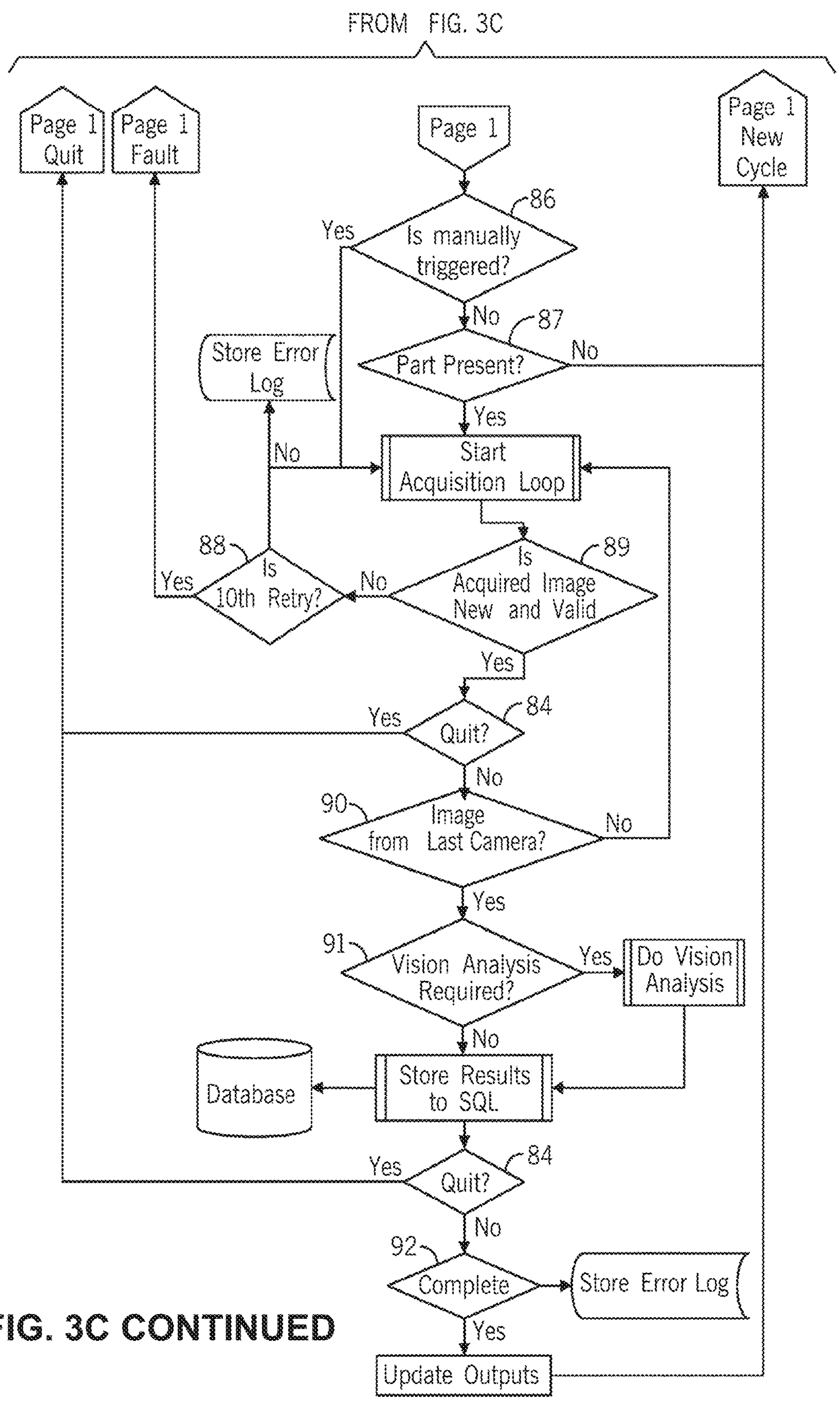

FIG. 3C provides a reference for the complete system process including: verifying the validity of the configurations 80 upon startup, waiting for a barcode scan to start the cycle if the system is configured that way 81 and waiting for a start signal if not 82, resetting the cameras if consecutive failures occur 83, closing the program when quit is pressed 84, verifying the validity of the part identification 85, wait for the user to press a grab button on the UI 86 or wait for a digital or industrial communications trigger 87, managing the camera connections to reset if consecutive failures detected 88, acquiring 89 and storing images, processing inspection 91, and reporting and storing the results when the image from the last camera configured is acquired 90. When the cycle completes 92, the program updates the results outputs and returns to the beginning of the sequence to start a new cycle.

The flowcharts of FIGS. 3A-3C do not specify the type of inspection 32 & 91 that could be, for example, traditional machine vision or AI deep learning. Instead, those flowcharts are intended to describe the sequencing software 26 portion of the novel fault detection method and system disclosed herein.

Figure 4:
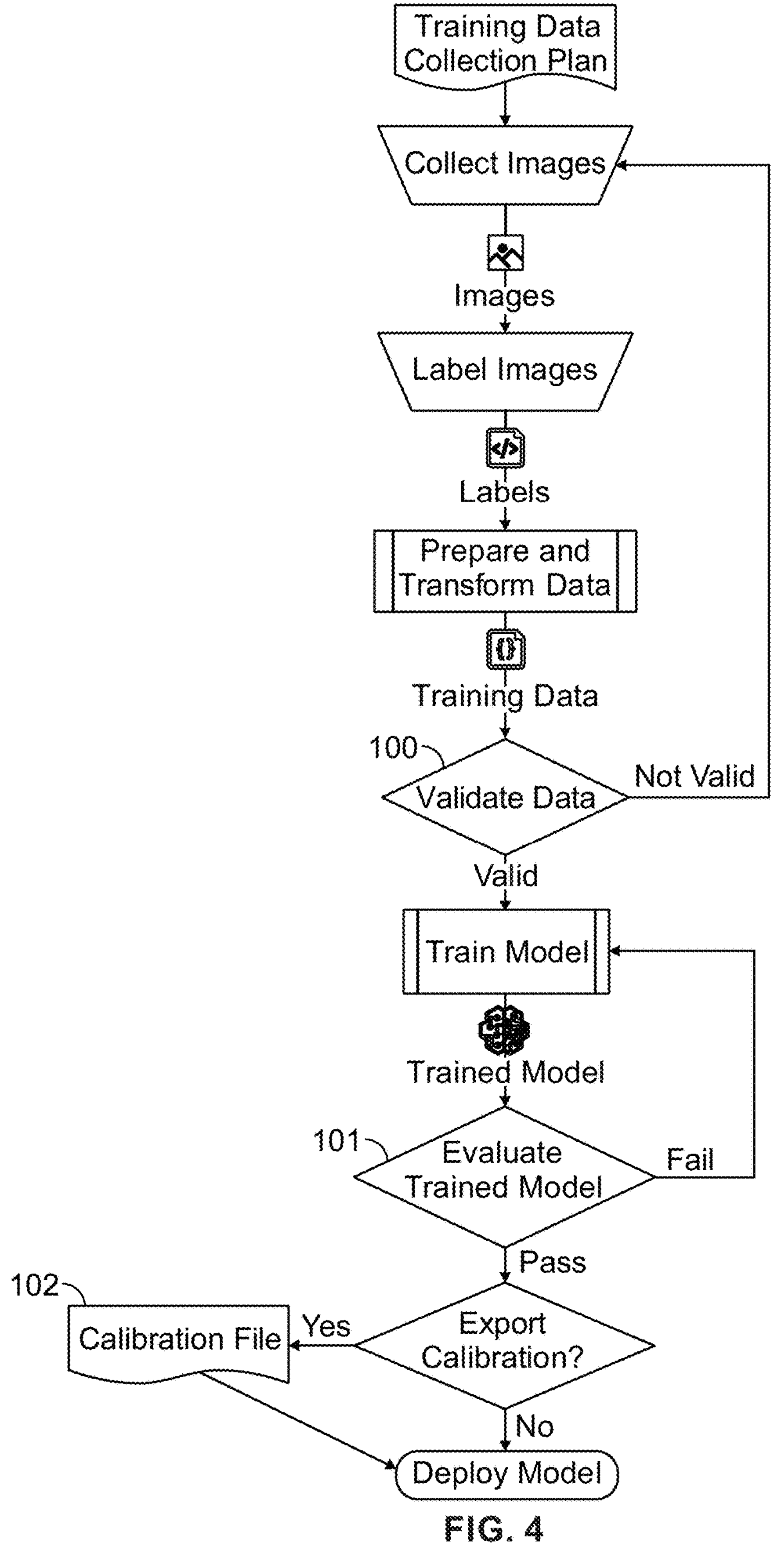
FIG. 4 is a flowchart showing an exemplary process of AI deep learning training according to exemplary embodiments.

FIG. 4 is a flowchart illustrating the process used to train the AI deep learning object detection model. The process can involve both human operations and machine operations to complete the steps required to train and deploy an AI deep learning object detection model in order to perform inspection.

The Collect Images process is a human activity that ensures trainable images are acquired and collected prior to labeling the images and results in a set of testing and training images. The Label Image process is generally a low skilled human activity involving drawing a bounding box around each object requiring detection and assigning a label to the object resulting in a label map for each image. Care is taken to ensure that a diverse set of images are collected to ensure that the AI deep learning model learns to distinguish good images from bad images which may have been taken under varying environmental conditions including lighting and positional differences from part to part.

The Prepare and Transform process is a machine-used process to remove improper images and labels and transform them into files in a data format the AI deep learning machine can process. The data is validated 100 in a process which alarms the user of unexpected labels, improper ratios of labels and splits the data into training and evaluation data. The Train Model process is a machine process that utilizes multiple graphic processing units to learn how to properly detect the labeled objects in the collect images process. If validation fails, the process must be restarted and reverified.

The training process produces model training checkpoints which can be used to continue training as changes in image data are discovered. As part of the training process, the progress of training regarding accuracy is evaluated 101 regularly to determine if the model is learning or not with a lack of learning indicating a problem with the image and label data or completion of training. Finally, when a model stops learning and the evaluation 101 produces reasonable accuracy, the model is deployed in the form of a frozen model (referred to as a trained model in this specification). Optionally, the best (highest score without producing a false failure or positive) score detected for each object during evaluation can be exported in the form of a calibration file 102 for use in setting the score threshold used for production inspection instead of using the score thresholds determined by the one button calibration process as described in FIG. 5A. Using a calibration file is a method that can be used to prevent the system user from incorrectly overriding the score thresholds which can result in false results.

Using deep learning cuts down on human resources typically required to train a configuration using standard machine vision algorithms. For example, the time to deployment using traditional machine vision for a part containing 4 objects usually takes 40 hours. Using deep learning, the training can be completed in less than four human hours by a far less skilled person saving time and resources. Also, deep learning has a better ability to adjust to or mask lighting and color differences in parts and objects. Using standard machine vision algorithms, lighting control is critical and typically different colored parts need to be configured differently adding to the configuration time.

Another advantage of using deep learning to do object detection for inspection purposes is the ease of deployment. Once a model is trained and deployed as a frozen model file, it can be placed in a designated directory on the PAQi computer 20 or networked computer 28 at which time the deep learning server knows to consume and ready it for use. Typical machine vision applications require both offline and online configuration as well as a movement of specific files to make modifications. The configuration also requires a person trained and skilled in machine vision which can slow down the deployment time depending on resource availability.

Embodiments disclosed herein further have capability to improve the function and operation of computer technology by requiring fewer processing steps. According to exemplary embodiments, the deep learning model can reside on a chip in the system controller or PAQi 1. Utilization of the deep learning model according to such embodiments can reduce the total number of operations needed to set up the machine. As a result, the calibration process after initial set up is far faster and simpler than calibration processes disclosed in the prior art. In addition, because the AI deep learning server can reside within the controller along with the PLC, overall latency can be improved by reducing time to transmit images and results over a network as well as communication time between the defect detector and IO with the manufacturing environment.

Finally, AI deep learning presents a number of advantages when used as disclosed herein. For example, it is open source software that is accelerating at a faster pace than proprietary systems. Additionally, it helps to reduce cost due, for example, to a lack of paid licensing that is required in proprietary systems.

Figure 5A:
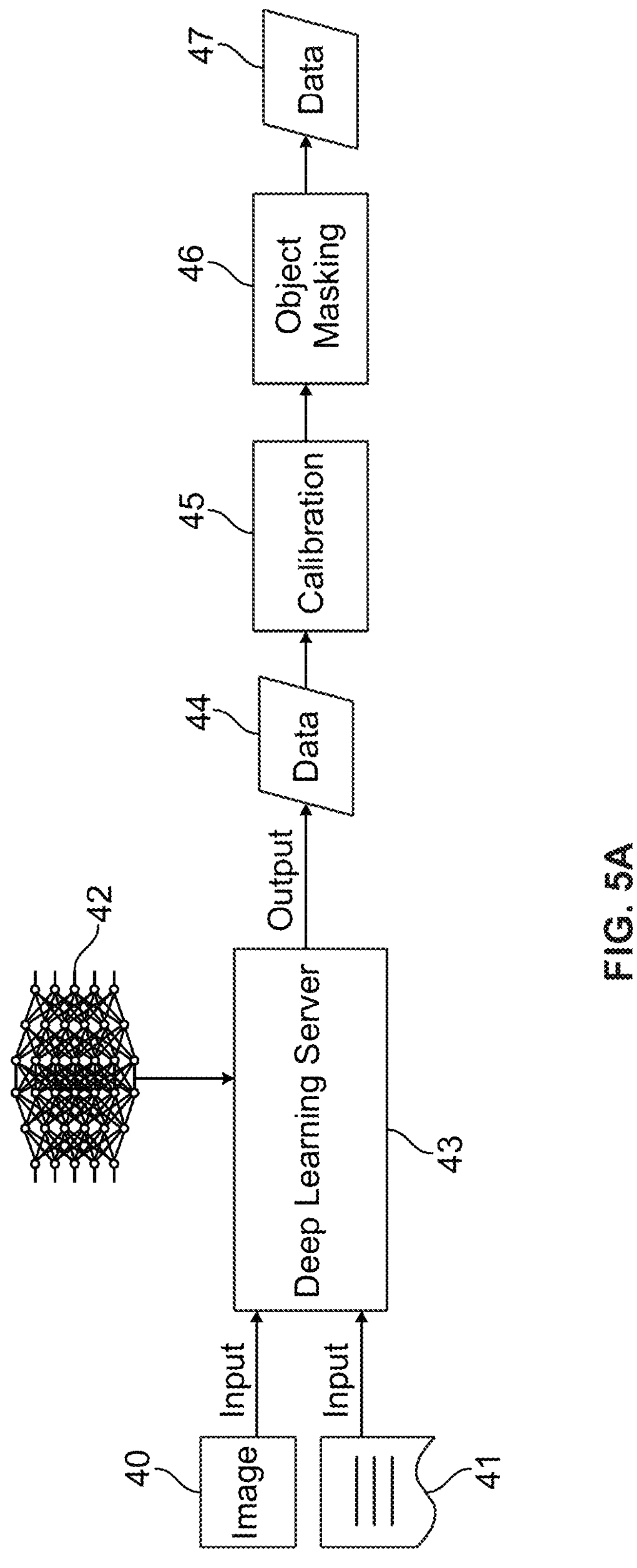
FIG. 5A is a schematic diagram showing an exemplary process for object detection according to exemplary embodiments.

FIG. 5A details the calibration process that consists of inputting a "golden" image 40 and label map 41 into the deep learning server 43 running a trained object detection model 42 resulting in an unordered object detection map output 44. The unordered object detection map 44 can be input into the calibration algorithm 45 to produce an ordered object detection map 47 which can be stored in memory for use in comparison to production images to determine the pass or fail state of each image. Order information regarding the detected objects can be determined using a variation of the Graham scan algorithm. Optionally, the ordered object detection map 47 can be altered to mask objects using the Object Masking algorithm 46. The Object Masking algorithm can be used to remove certain objects from the ordered object detection map by either the name or location by drawing a bounding box around areas of it. This is valuable in cases where machine components such as a screw are similar to the part under inspection 2 objects where it is best to train the model the two are different for improved accuracy but where the screw on the machine may not always be present or may be replaced during regular maintenance. It is also valuable in application where there are small parts bins in the camera's 4 field of view such that they can be mistakenly detected as a component on the part under inspection 2.

By providing a single button calibration process with masking, the system can save on human configuration time and more importantly, allow for on the fly adjustments to be made to the pass/fail criteria when typical changes are made to the robot end arm or the fixture holding resulting in a change of position or orientation of the detected objects in order to limit production down time and prevent the disabling of the inspection process while production is running.

Figure 5B:
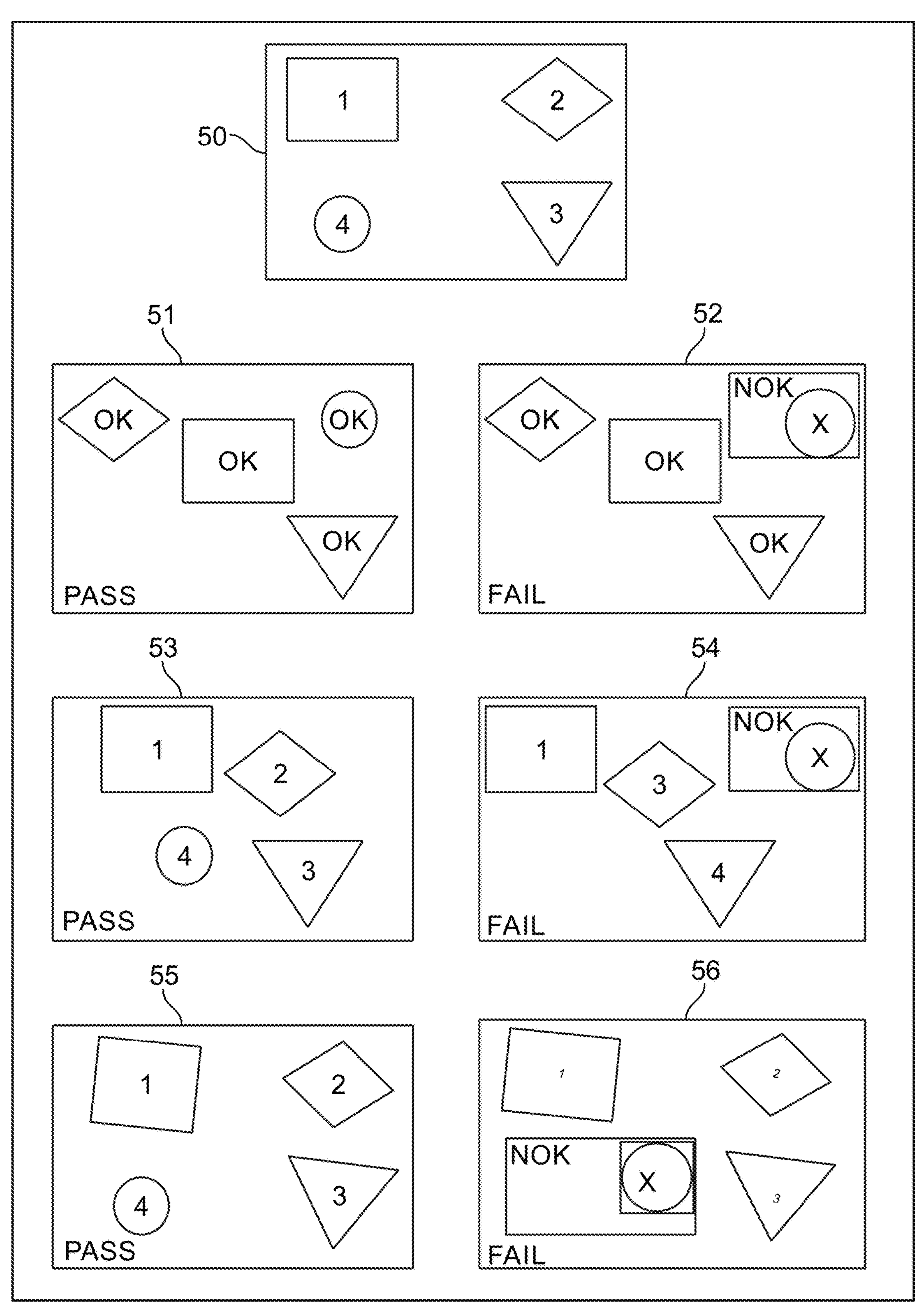
FIG. 5B is a schematic diagram showing exemplary results of an inspection based upon an example calibration with objects arranged on a part in varied locations and order.

Alternatively, the score thresholds generated by the calibration process can be modified to set the sensitivity of the system to err on the side of false failures for safety critical inspections. Furthermore, FIG. 5B shows an illustrative representation of an ordered object detection map 50 for four objects: rectangle, diamond, triangle, and circle. The italic numbers represent the calibrated order of the objects. Images 51-56 represent images of a product with the detectable objects in different locations within the image. In images 51 & 52, the inspection system is configured to only check for the presence of each object and not the order and position of the objects.

Because each of the expected objects are present, image 51 passes the inspection. In image 52, the inspection fails because the circular object is missing from the image as represented by the dotted circle. In images 53 & 54, the inspection system is configured to check for the correct order of the objects within the image. In image 53, the inspection passes because the order of the detected objects matches the order of the calibrated image 50. In image 54, because the circle is detected in the upper right corner of the image, the inspection fails for an out of order condition. In images 55 & 56, the inspection system is configured to verify the position of each object within a tolerance of the expected object positions determined through calibration. Even though the objects are rotated in image 55, they are in a relatively similar location (overlap the expected positions within the configured tolerance) to the objects in the calibrated image 50 and pass the inspection. In image 56, the circular object does not overlap the expected position within the configured tolerance and the inspection fails.

Figure 5C:
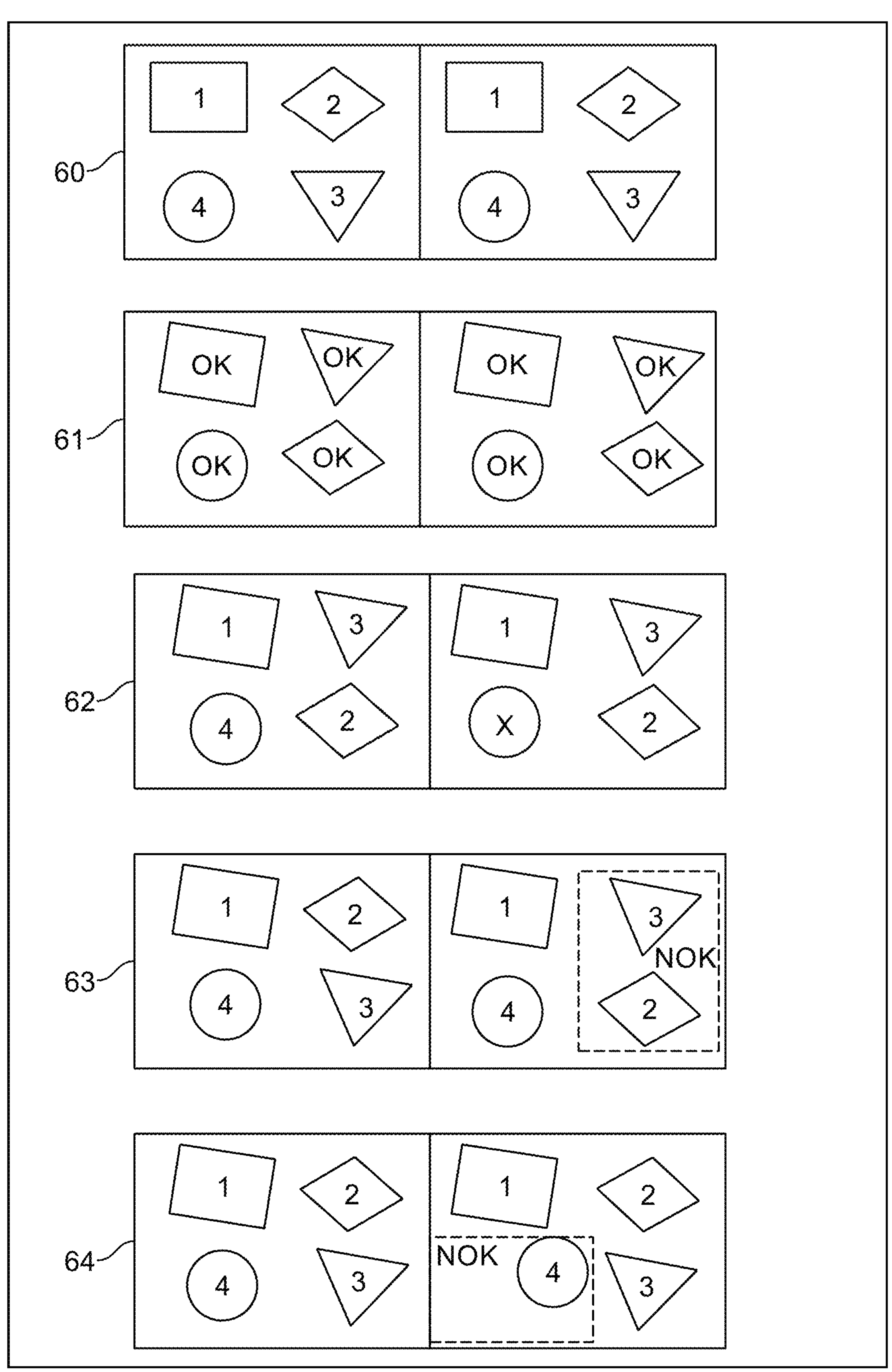
FIG. 5C shows exemplary results of an inspection on a multi-cavity molded part based on an example calibration with objects arranged on a part in varied locations and order.

FIG. 5C shows a similar representation of the inspection process using AI Deep Learning on a multi-cavity mold such that two similar parts are presented to the system for inspection. Because object detection with our calibration layer localizes the objects inspected, the system can determine if one or both overall parts is defective and scrap only those that fail the inspection, eliminating the need to scrap both parts. As in the previous example, two parts are calibrated to produce an ordered object detection map 60. When deployed for production with the configuration set to disregard the order and position of the objects, the two parts 61 pass inspection because all objects being detected are present. If one object is missing on the right-side part 62, the inspection fails but the system can signal the robot, conveyor, or fixture to scrap only the right side part and pass the left side part down line. If the software is configured to detect the order of the objects only, when presented with two parts 63 with the right one having objects out of order, the right-side part is reported as a failure while the left side passes inspection. Finally, if the system is configured to detect the objects in order and in position, if a set of parts 64 is presented to the system with one object out of position in the right-side part is reported as a failure and removed from production.

The system also allows for inspecting the non-presence of objects. If, for example, you calibrate an image with no detectable objects present, the system will expect no objects to be present and fail the inspection if objects are detected. This proves to be useful in a host of applications for detecting unwanted items such as debris and defects.

Figure 5D:
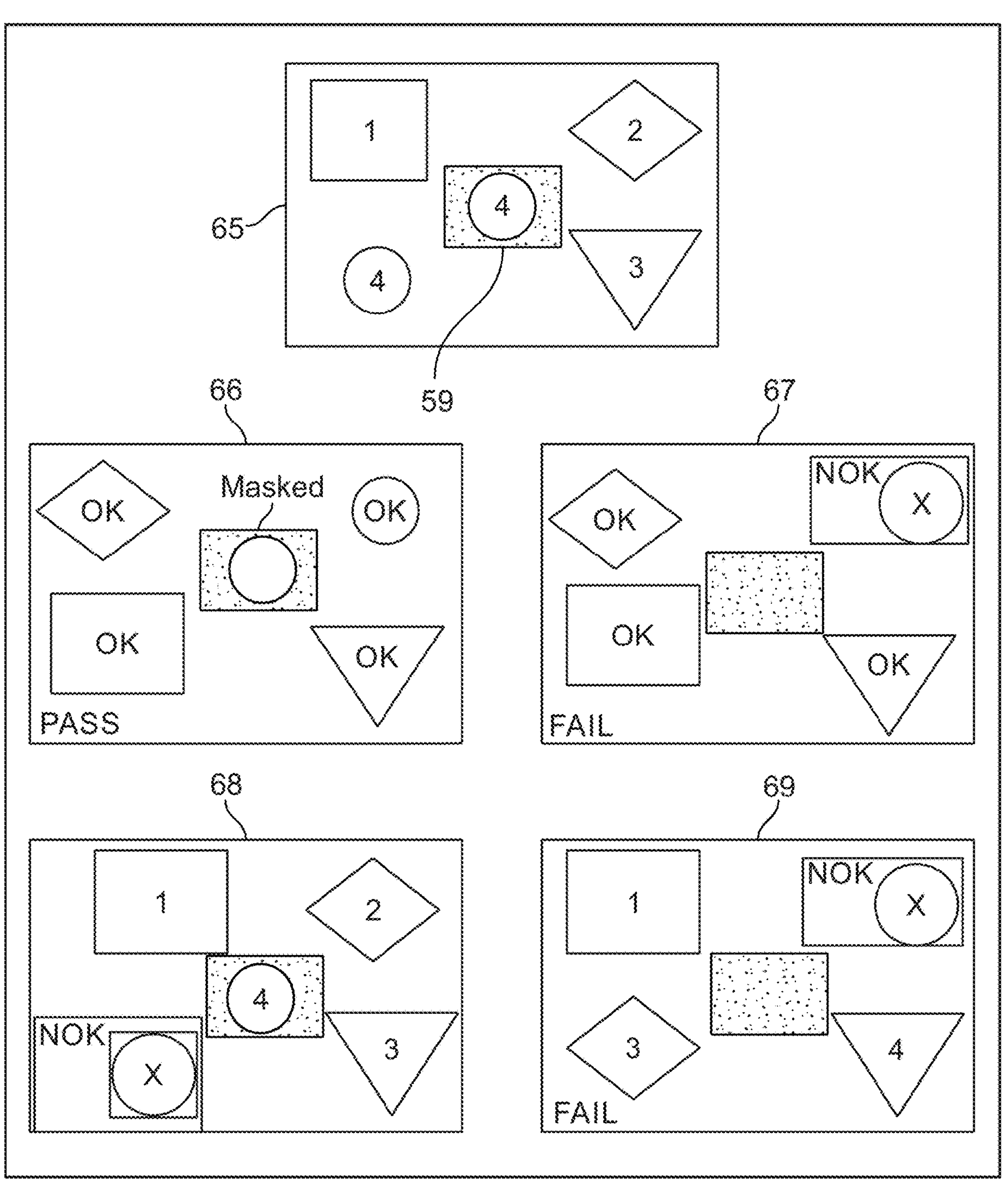
FIG. 5D shows exemplary results of an inspection based on an example calibration with objects arranged on a part in varied locations and order with region masking.

FIG. 5D shows a representation of an ordered object detection map 65 for four objects: rectangle, diamond, triangle, and circle with a center region with a circle within masked 59. The italic numbers represent the calibrated order of the objects. Images 66-69 represent images of a product with the detectable objects in different locations within the image. In images 66 & 67, the inspection system is configured to only check for the presence of each object and not the order and position of the objects.

Because each of the expected objects are present, image 66 passes the inspection. In image 67, the inspection fails because the circular object is missing from the image as represented by the dotted circle. In images 68 & 69, the inspection system is configured to check for the correct order of the objects within the image. In image 68, the inspection fails because the circle falls within the masked region. In image 69, because the circle is detected in the upper right corner of the image, the inspection fails for an out of order condition.

Figure 6:
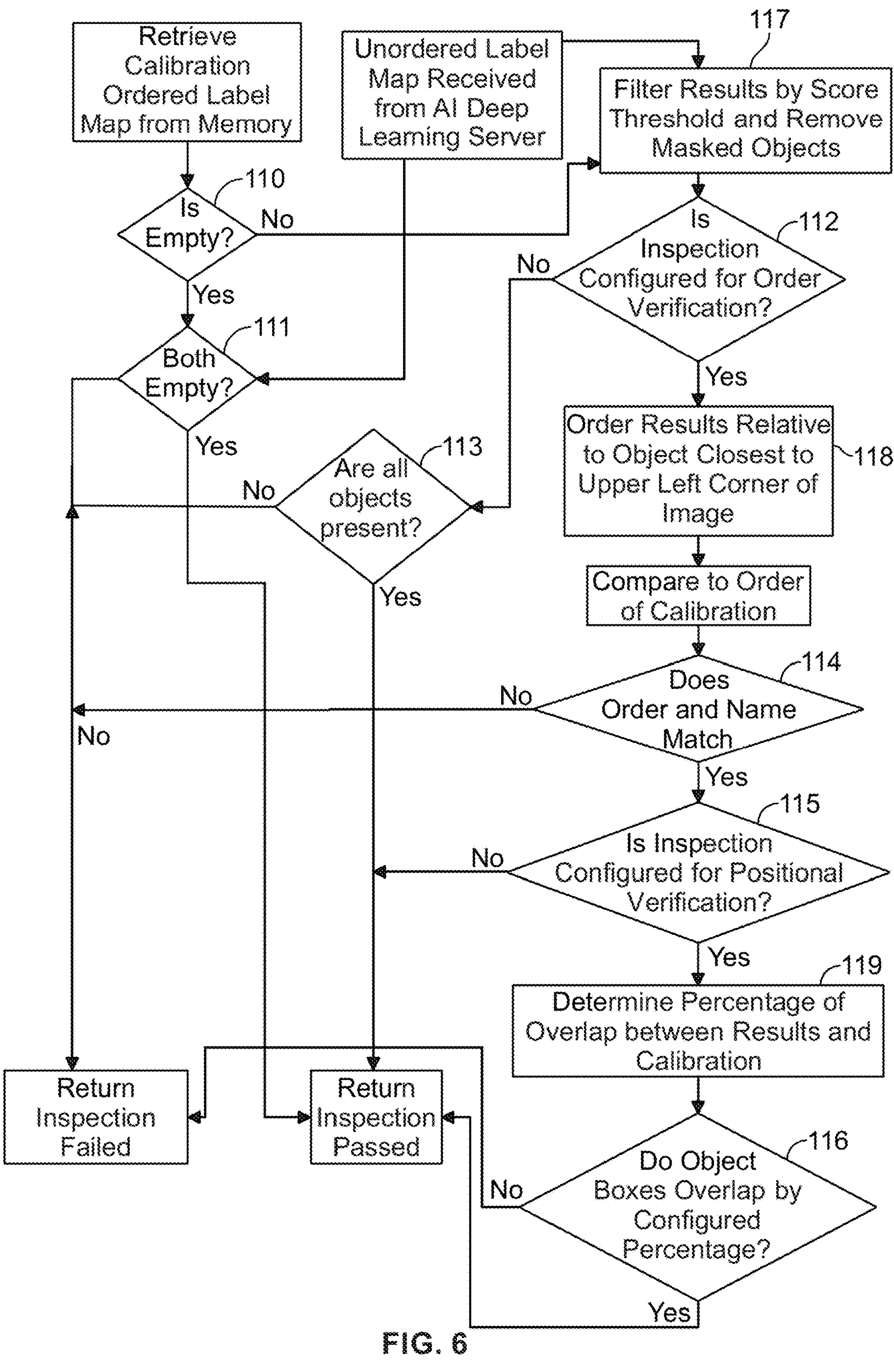
FIG. 6 is a flowchart showing an exemplary process for determining pass or fail of a part based upon an ordered object detection map produced by a calibration process according to exemplary embodiments.

FIG. 6 describes the process to determine pass or fail based on the calibration data and the object detection results returned from the AI deep learning server. As shown in the flowchart, the invention provides a means for inspecting parts by: 1.) verifying the presence or non-presence 113 of the objects the model is trained on by determining if the calibration ordered label map is empty or not 110 and if the returned unordered label map is empty 111, and/or 2.) verify that the order of the detected objects 114 if configured 112, relative to the top left corner of the object, match the calibrated order, and/or 3.) verify the position of each detected object versus the expected position of each object by overlapping their found bounding boxes and comparing to an overlap percentage threshold 116 if configured 115. Depending on the application requirements, the system is capable of first detecting only quality objects or the non-presence of defects and then their correct order or positioning on the overall part to avoid false positives and improve quality control.

In order to provide the three methods for determining pass/fail, the invention can first filter/remove all detected objects below a score threshold using a numeric comparison as well as remove any objects found within configured masking areas 117. Masking can involve calculating the center of each object by finding the midpoint of the Xmin and Xmax and Ymin and Ymax returned by the trained object detection model 42 in an unordered object detection map output 44. If the calculated center point overlaps any configured masking area, it can be removed from the unordered object detection map 44 prior for use by the three methods used for determining the pass/fail result. Masking can also be done by removing detected objects from the unordered object detection map 44 by the object name.

Process 118 can be carried out using a variation of the Graham scan algorithm on the unordered object detection map output 44. Because the same algorithm can be used to determine the order of the objects in the golden image 40 for use in calibration, each ordered object can be compared to the calibration data. If both the object name and order are equal for all detected objects after applying the filtering by score and remove masked objects process 117, the overall inspection result is set to pass. If any objects do not match the calibration on the object name and order, the inspection result is set to fail.

Process 119 involves calculating the percent of overlap between each object detected to the expected position of the objects held in the calibration. The overlap percentage is calculated by 1.) sorting the X coordinates of the expected object position and the real object position, 2.) subtracting the $2^{nd}$ smallest X coordinate from the $2^{nd}$ largest X coordinate, 3.) repeating for the Y coordinates, 4.) multiplying the resulting X and Y coordinate values, and 5.) dividing the product by area of the expected object in the calibration data. If there is no overlap between the objects, an 0 overlap value is returned by the algorithm for use in the overlap comparison 116 to determine the pass/fail result.

An alternative method for determining the pass/fail result of an inspection is to use AI Deep Learning Object Detection to output an unordered label map to the input of a AI Deep Learning Classifier Model such that it outputs a class that can be compared to the expected class to determine pass or fail. This method eliminates the need for the single button calibration and is done at the server level versus the PAQi software level. This method for determining the pass/fail result is optimal in instances where the position or order of the objects detected can vary rendering the previously described methods inaccurate because deep learning can be used to teach the system how to make the pass/fail determination using a complex rule based algorithm versus the basic mathematical processes described in FIG. 6.

Figure 7A:
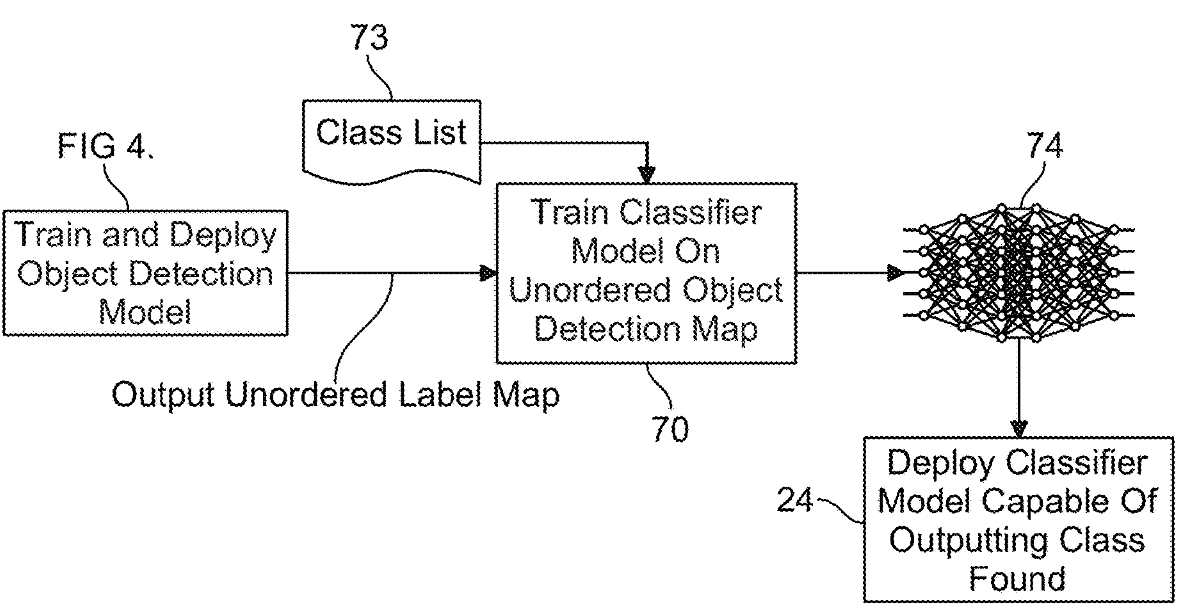
FIG. 7A is a schematic diagram showing a process of classifying a set of detected objects in order to eliminate the need for a separate layer of software to determine pass or fail.

FIG. 7A demonstrates the process where the learning pipeline is executed as described in FIG. 4 and the output is fed into another training pipeline to do classification 70 using a class list 73. The process produces a trained classifier model 74 which can be deployed on the AI Deep Learning Server 24. While the inputs are different for classification, the FIG. 4 process applies. The output of the training process is a frozen classification model 74 that is processed by the same deep learning server 24 used for object detection processing. It is also possible to combine the two trained models produced to run them on the AI Deep Learning Server 24 as an object detection and classifier module that outputs a pass or fail result only.

Figure 7B:
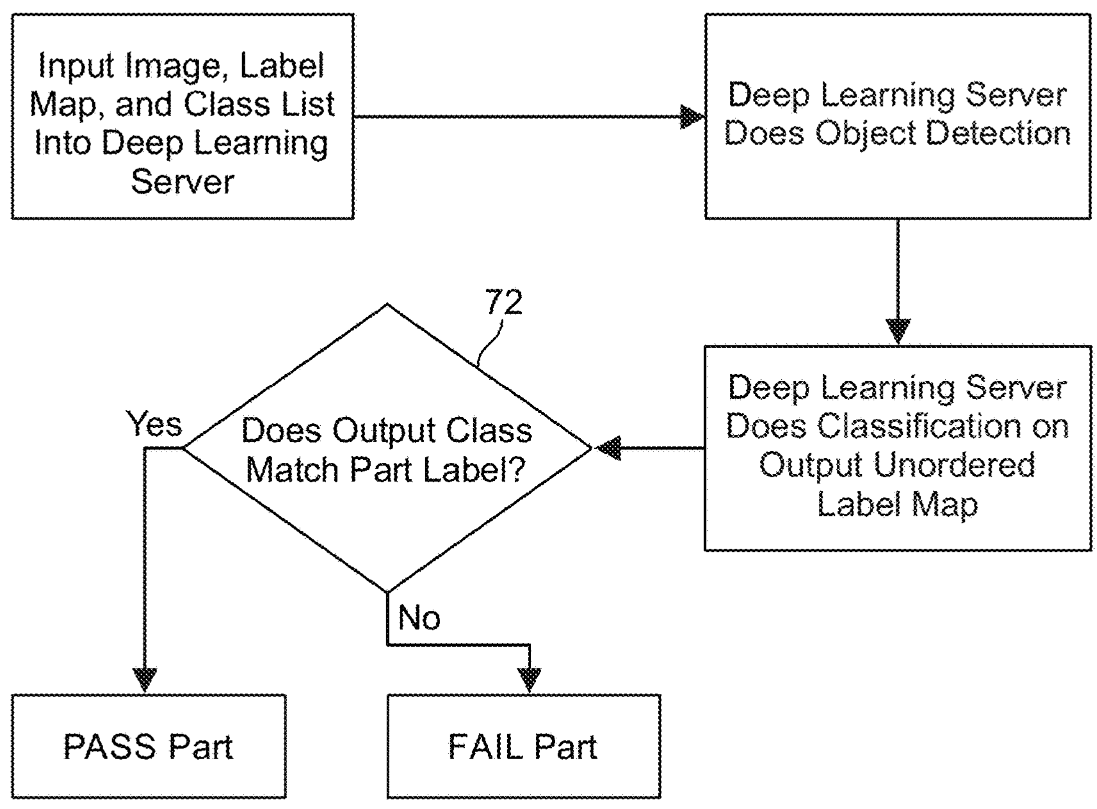
FIG. 7B is a flowchart showing an exemplary process for calculation of pass or fail based upon the deployment of multiple models to perform the inspection according to exemplary embodiments.

The FIG. 7B flowchart shows the simplified process of determining pass or fail on an image when utilizing both object detection and classification as an alternative to the calibration process detailed in FIGS. 5 & 6. While the two models may be combined into one overall model, the general inputs are images, an object label map, and a class list. After processing the inputs, the deep learning server outputs the class found which is then compares 72 to the part label under inspection to determine pass or fail.

One beneficial aspect of the invention disclosed herein is that no human interaction is required to inspect and sort the defect images after they are detected. All of that processing is done automatically using the software stored in the PAQi computer 20 or networked computer 28.

FIGS. 8-14 illustrate additional detail process identification, camera configuration, traditional machine vision inspection, lighting control, data storage, automated labeling, and overlaying and displaying the analysis results on the original image.

Figure 8:
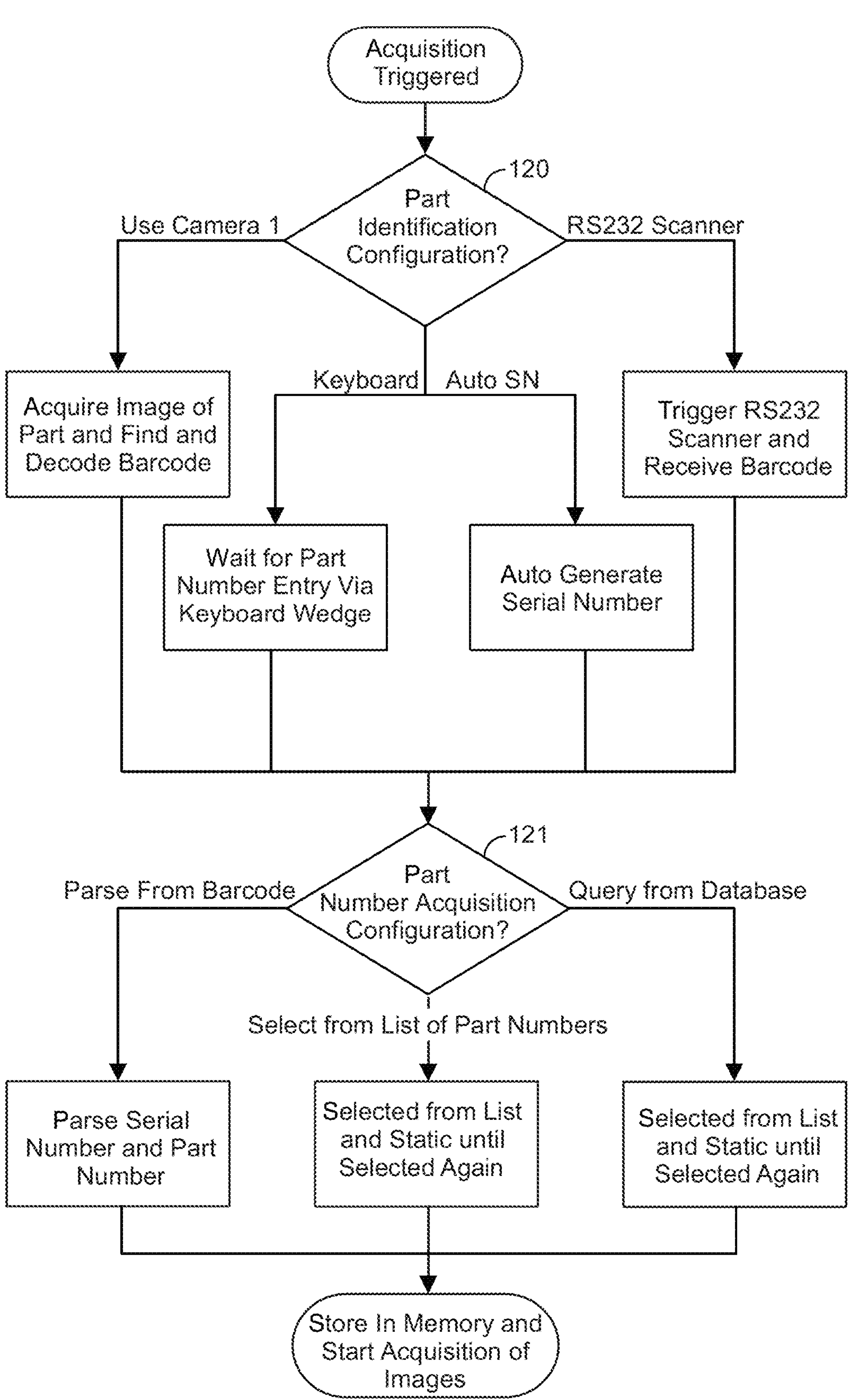
FIG. 8 is a flowchart showing an exemplary process of part identification whereby the serial number and part number of an inspected part is determined.

FIG. 8 is provided to explain how the system identifies the product being inspected. According to exemplary embodiments, the inspection results and acquired images can be named by the serial number of the part inspected. As such, it can be important to either acquire or generate the serial number before starting the inspection according to such embodiments. Furthermore, the part number under test can be used to select the type of inspection and calibration details used to process the inspection in addition to the camera parameters used to acquire an image of proper quality to ensure reliable inspection. The program can load the part identification configuration 120 to determine the type of part identification to use. The unique serial number can be auto-generated by datetime or by parsing a barcode scan from a barcode scanner or a camera using tradition or AI based OCR or barcode decoding. The program also uses the loaded part identification configuration 121 to determine how the specific part number is acquired. The part number can be manually selected, queried from a SQL database, or parsed from the barcode scan. Once acquired, the serial number and part number are stored in memory for use in image and data storage, setting camera parameters, and selecting the configuration to use for inspection.

Figure 9:
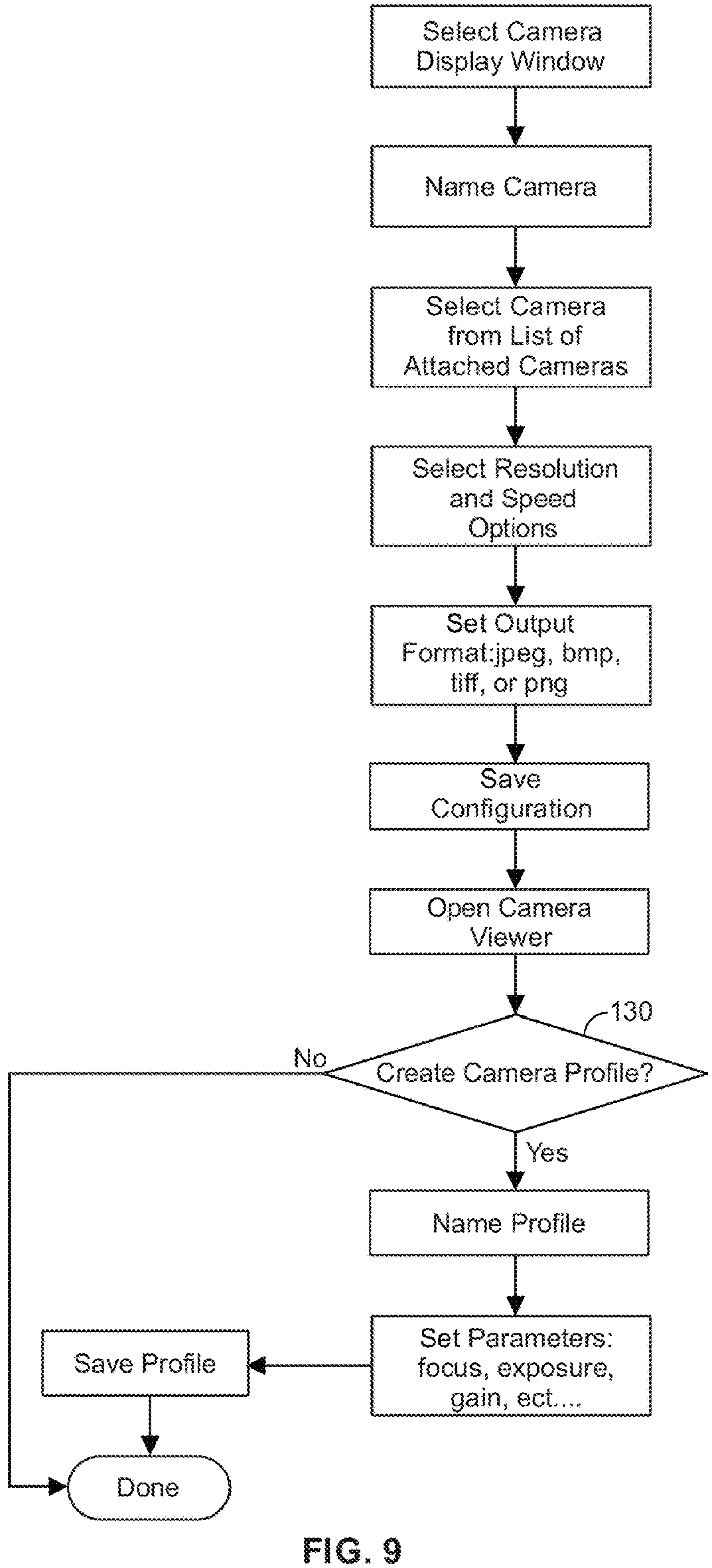
FIG. 9 is a flowchart showing an exemplary process of configuration of cameras according to exemplary embodiments.

FIG. 9 demonstrates the process of setting up the cameras to acquire images of the required quality to perform reliable inspection no matter the type of inspection configured. Because the system is capable of acquiring images from up to 6 cameras, it is necessary to link the acquired image to a window on the user interface. If the software 26 is configured to display the images after acquisition and inspection, the corresponding image will be displayed on the user interface in the order configured. It is also necessary to specify the resolution of the image to acquire and the acquisition speed in frames/seconds. Another useful feature of the software 26 is that it allows each camera to be parameterized by part number by creating camera profiles 130 to adjust the internal settings of the camera such as focal length for auto-focus cameras, exposure, brightness, and gain to manage the quality of the image at the point of acquisition and prior to inspection to reduce the amount of image transformation and therefore time to perform inspection.

Figure 10:
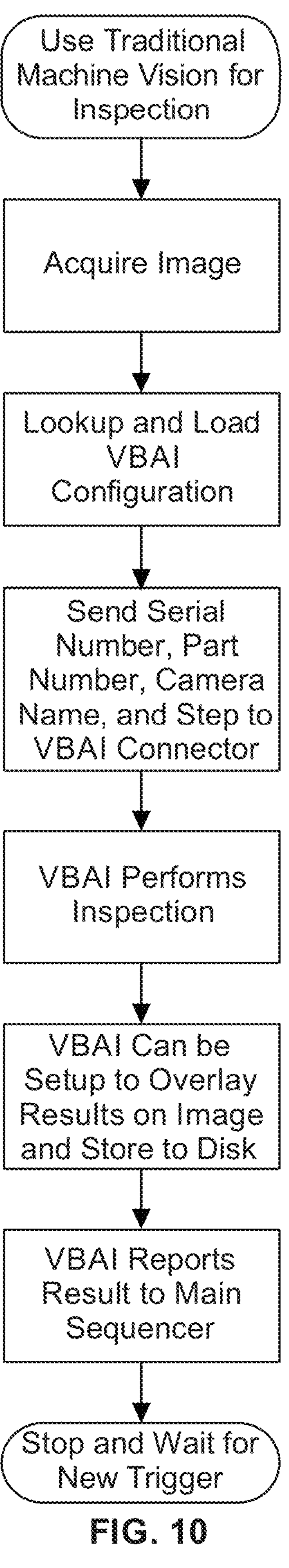
FIG. 10 is a flowchart showing an exemplary process for interfacing with vision builder for automated inspection (“VBAI”) to do traditional machine vision inspection.

FIG. 10 explains the API for interacting with National Instruments' VBAI traditional machine vision server. As mentioned, VBAI is a rules-based program requiring information about the part being inspected to know which rules to apply to determine pass or fail. VBAI is capable of storing images with the inspection steps and metadata overlaid on the original image for use in displaying in the PAQi's user interface.

Figure 11:
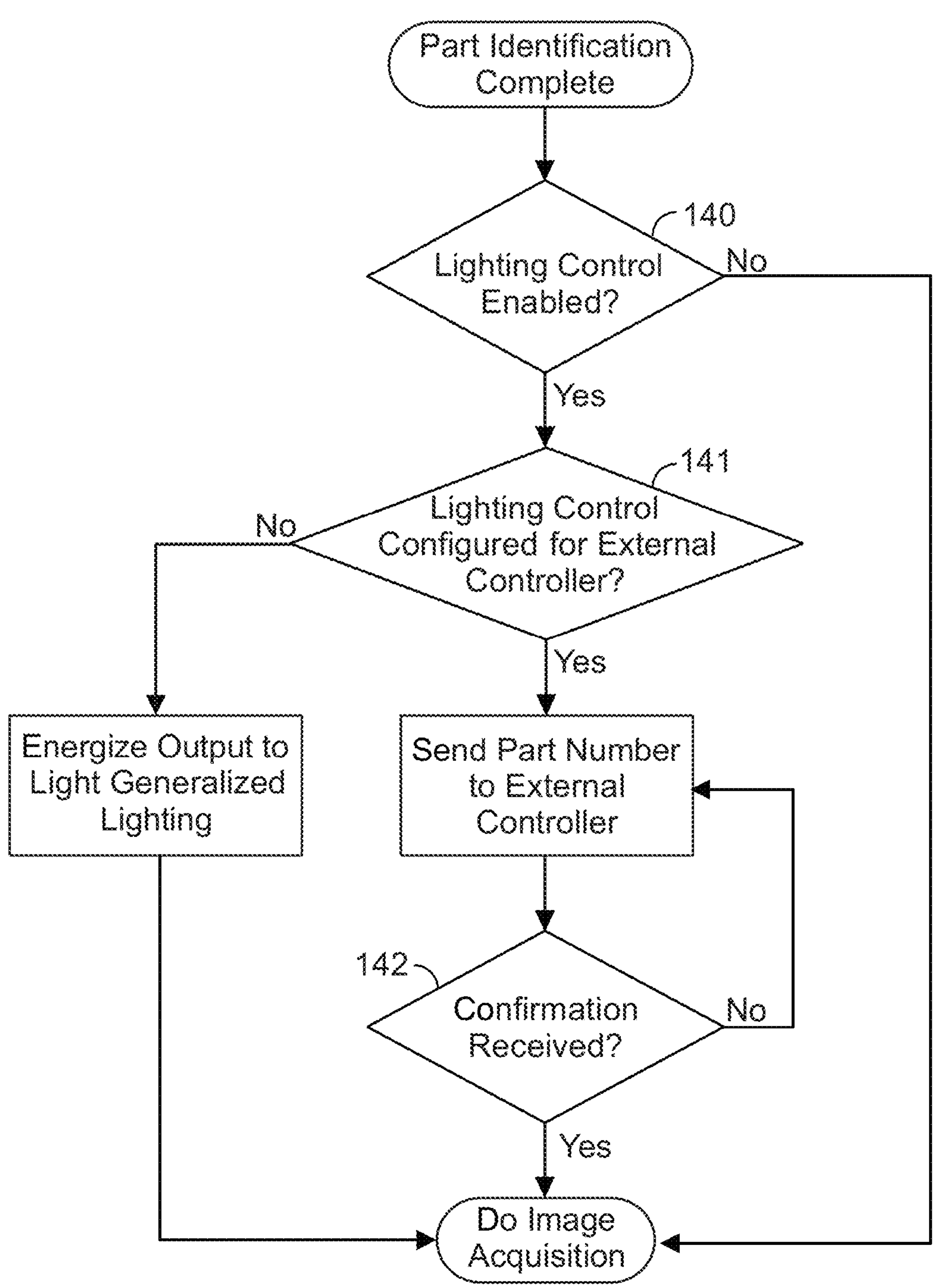
FIG. 11 is a flowchart showing an exemplary process for the control of lighting according to exemplary embodiments.

FIG. 11 details the process of lighting control in the event the application requires special lighting to improve the accuracy of inspection. As noted previously, this invention teaches that inspection using AI deep learning is less sensitive to lighting variance but in the event AI based object detection is not able to perform an inspection and traditional machine vision is required, lighting control can make the difference between a robust and reliable system and one prone to errors. For this reason, the software 26 is able to control lighting prior to image acquisition by first determining if lighting control is enabled 140. Lighting controls can be as simple as energizing an LED a fraction of a second prior to acquisition or advanced strobing using an external light controller 141. If an external light controller is deployed, a feedback loop 142 is used to confirm the lighting is set prior to acquiring an image.

Figure 12A:
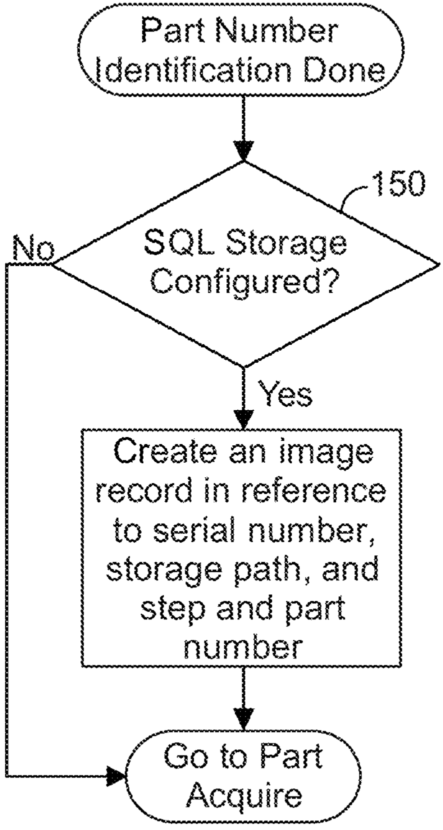
FIG. 12A is a flowchart showing the initial storage of data to a SQL database after an image is acquired according to exemplary embodiments.

FIG. 12A briefly explains the process of creating an image record in a SQL database if SQL storage is enabled 150. In order to link detailed inspection results to the image used for inspection, a record of the image must first be created.

Figure 12B:
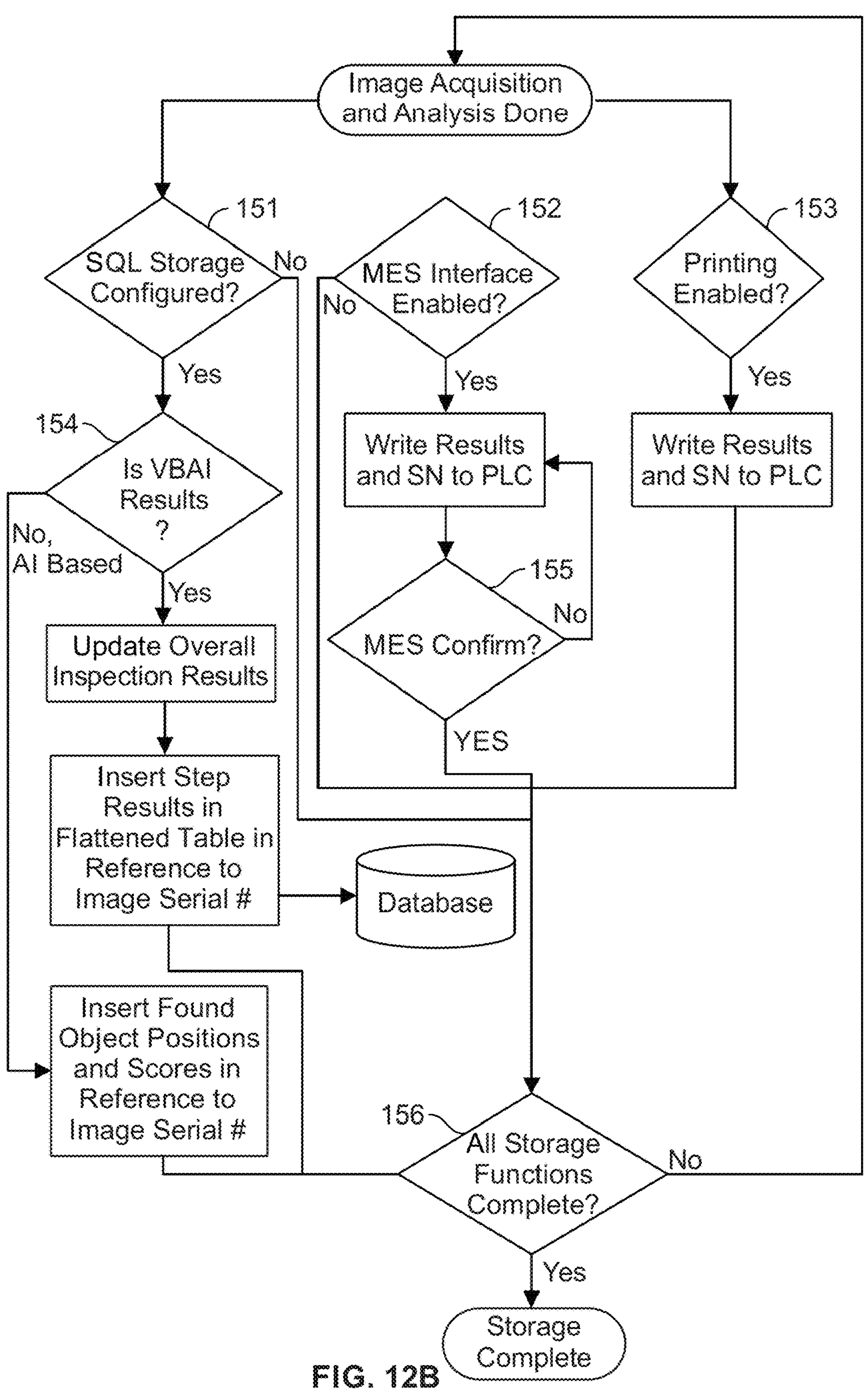
FIG. 12B is a flowchart showing the results data storage process according to exemplary embodiments.

FIG. 12B details the process of storing the detailed inspection results to SQL, printing the results, and/or making them available to external manufacturing execution system (MES) for use in post-process data analysis. Though VBAI provides a means to log results to a text-based file by default, embodiments presented herein can provide a unique means to store the detailed step results, if enabled in the configuration 151, in a standard format allowing for data mining across a large data set. Similarly, when performing inspection using AI deep learning instead of VBAI 154, results returned by the server can be automatically stored to SQL so that they can be used for offline analysis of items of interest such as the manufacturing machine performance. In addition, options are provided for interfacing with the manufacturing system's MES, if enabled in configuration 152, using the system's PLC 22 and program 27 in order to report the results to a supervisory layer responsible for traceability. Under this configuration, the system can have and utilize a feedback loop 155 to verify the results were properly exchanged before moving on to the next sequence step. This is especially useful in the automotive industry where safety critical data must be stored for up to 30 years. Finally, for parts being inspected without a barcode, such as a part directly inspected off of a molding machine, it can be useful to print a barcode with the part serial number and results for traceability down line. Printing may be enabled 153 in the software configuration to print labels. When all storage steps are completed 156, the storage process can be terminated until the next part is processed.

FIG. 12C provides a structural view of the VBAI step results table with example data.

Figure 13A:
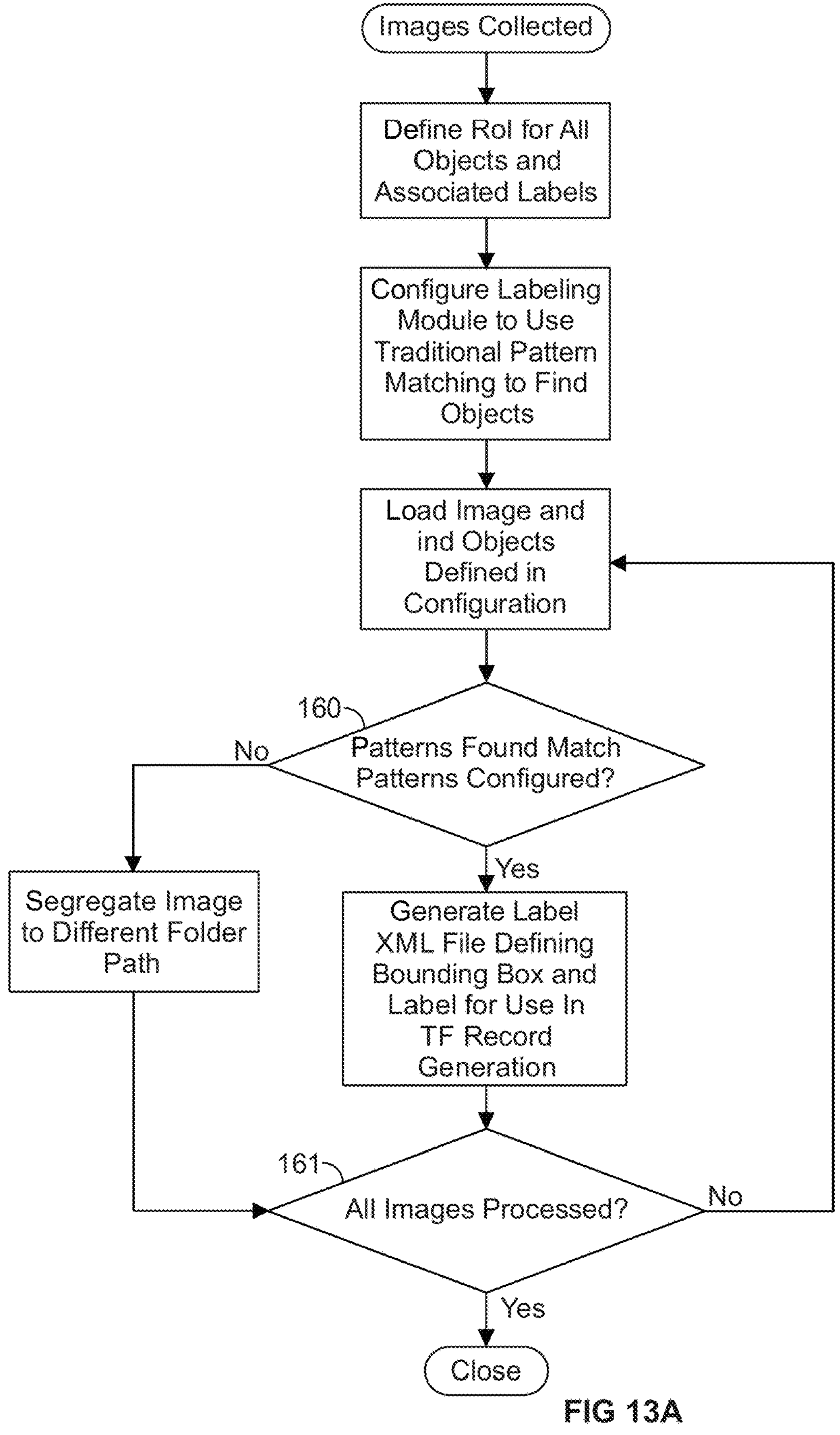
FIG. 13A is a flowchart showing a process for automated labeling for use in training the AI deep learning model according to exemplary embodiments.

FIG. 13A describes an improvement to the AI deep learning training process to automate labeling and therefore further reduce the time to inspection deployment. As described in FIG. 4 and the detailed text, while significantly reducing the time to deployment and the level of skill required for deployment, AI deep learning-based inspection requires an individual to label the objects to detect prior to training them.

One aspect of the invention disclosed herein is an automation of the labeling process in circumstances where the objects can be identified but not classified under controlled image acquisition to reduce the labeling time and effort. Automation generally requires that the part being inspected be presented to the camera in the same position relative to the camera such as a molded part presented to a camera using a robot. The matching process looks for a high match score and will only label objects 160 that are identified with a high degree of certainty while those identified at a low certainty would be segregated in order for a human to verify and correct the labels. This process can be repeated on all sample images until all images are processed 161. It may be necessary for a human to review the automatically generated labels prior to training on the images per FIG. 4, but in the least the labeling process would be faster if some or all were automatically generated.

Figure 13B:
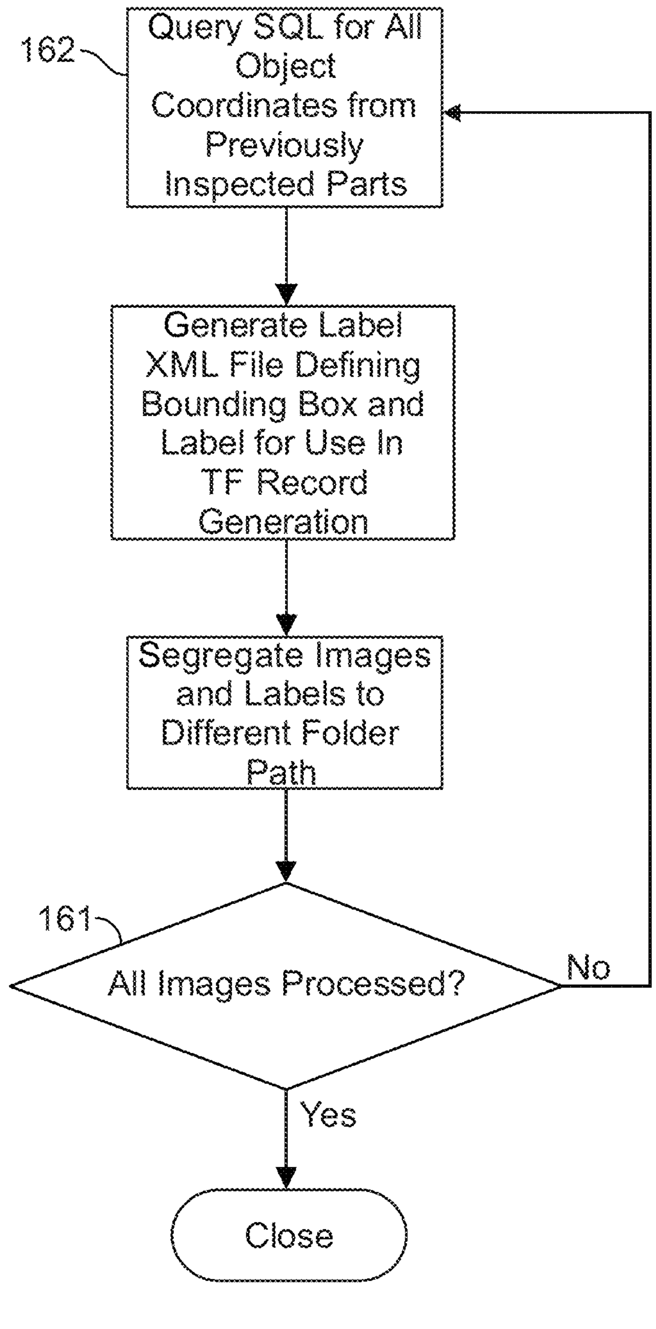
FIG. 13B is a flowchart showing an exemplary process of automated labeling using the results of previous inspection for use in training the AI deep learning model according to exemplary embodiments.

FIG. 13B describes an improvement to the AI deep learning training process to automate labeling and therefore further reduce the time to inspection deployment. As described in FIG. 4 and the detailed text, while significantly reducing the time to deployment and the level of skill required for deployment, AI deep learning-based inspection requires an individual to label the objects to detect prior to training them.

One aspect of the invention disclosed herein is an automation of the labeling by mining the results data from the SQL server 162 described in FIG. 12B to automatically generate labels. Under this method of automated label generation, the parts do not need to be in a known location, but the initial trained model must be accurate enough to reduce human verification time considering labels are generated to train the model more accurately meaning the model is not yet trained to perfection. Another advantage of this type of label generation is that it can be done periodically to improve model accuracy over time with no addition production processes because the object locations found are already stored to the SQL server. This process is repeated on all previously inspected images until all images are processed 161 within the configured time frame.

Figure 14:
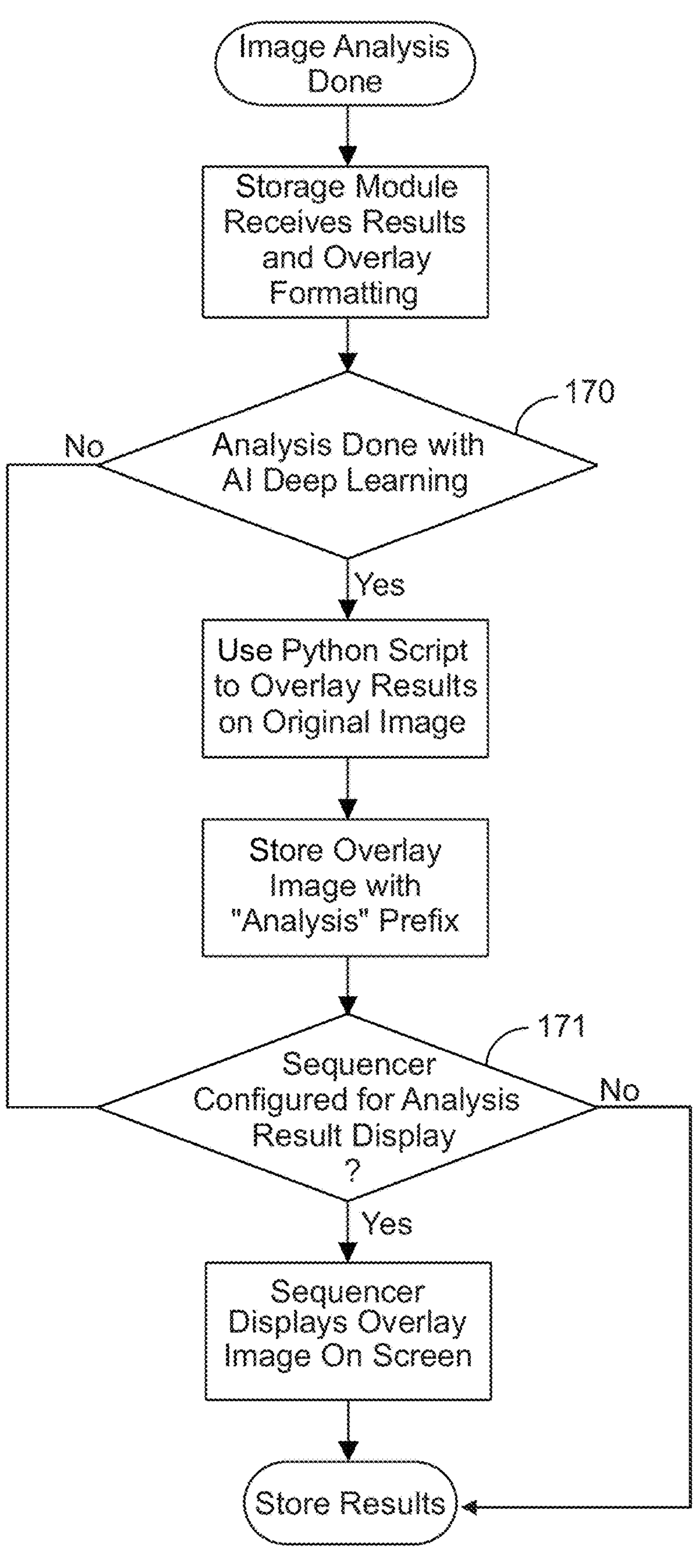
FIG. 14 is a flowchart showing the image analysis results overlay generation process according to exemplary embodiments.

To avoid ambiguity with prior art systems regarding the display of inspection results, FIG. 14 details the process of overlaying the inspection results on the original image and storing them as a low-quality image to display to the system operator to indicate the results. This process is done on demand and in parallel to the primary functions of the software 26. When running the inspection through VBAI, custom overlays can be generated within the software and displayed in the software user interface. For this reason, the software 26 determines the type of inspection used 170. When inspecting using AI deep learning, the inspection results returned from the AI deep learning server must be overlaid on the original image acquired. This is done using a python script that can be modified in run time to produce the desired results. If the software 26 is configured to display the image with overlay 171, it displays the image on the user interface to signal the point of failure to the system operator.

The software 26 provides a configuration to specify where to place the overall results as well as the background color and text color of the overall results to handle different colored parts and backgrounds. Finally, the software 26 provides a configuration for enabling verbose results overlay containing the resulting accuracy (or certainty) score, the resulting overlay score as well as the expected scores and bounding boxes and labels for found objects. In non-verbose mode, the overlay function overlays a configurable image representing pass or fail so the user can customize it as desired.

One beneficial aspect of the invention disclosed herein is the use of a deep learning object detection model to do object detection. This is advantageous because, for example, it eliminates a possible requirement to use separate modules for locate, analyze, classify, and read text that must be chained together to do inspection in prior art systems.

Another beneficial aspect of the invention disclosed herein is the elimination of the requirement for a trained user to configure prior art detection systems prior to deployment.

Yet another beneficial aspect of the invention is the provisions of a single button calibration to train the expected order and position of the objects being detected. This greatly speeds up the process of getting the system up and running for production.

An exemplary system for practicing the claimed invention comprises an image capture device, a manufacturing machine that is adapted to produce at least one part each time the manufacturing machine is used, and a presentation mechanism operably coupled to the manufacturing machine, the presentation mechanism being adapted to move the part from the manufacturing machine to be in operative relation to the image capture device. The system also includes:

a. a system controller electronically coupled to the image acquisition device, the system controller having a programmable processor utilizing processing circuitry, electronic memory, a programmable logic controller and input/output circuitry, the system controller being configured to carry out detection of the part;

b. an ordered object detection map stored in the electronic memory, the ordered object detection map comprising predetermined detectable objects associated with the part, the ordered object detection map being generated from object detection map output processed according to predetermined calibration criteria, the object detection map output being created by execution of a trained object detection model on input comprising at least image data and a label map; and c. computer-readable instructions executable by the programmable logic controller, execution of said computer-readable instructions causing electronic signals to be sent between the system controller, the presentation mechanism and the image capture device, said electronic signals comprising at least first, second and third control signals;

According to exemplary embodiments presented herein, the first control signal can be sent by the programable logic controller to the presentation mechanism to actuate the presentation mechanism to physically engage the manufactured part for presentation to the image acquisition device. The second control signal can be sent by the programable logic controller to the image acquisition device to actuate the image capture device to capture a visual image of the manufactured part. The image data from the visual image can be identified and processed by the programable processor. The image data can comprise detectable objects from the visual image. The detectable objects from the visual image can be processed by the programable processor and circuity in relation to the predetermined detectable objects of the ordered object detection map to render at least one of a pass determination and a fail determination. The pass determination can be rendered where detectable objects from the visual image correspond to predetermined detectable objects of the ordered object detection map and the fail determination can be rendered where detectable objects from the visual image fail to correspond to predetermined detectable objects of the ordered object detection map. The third control signal can be sent by the programable logic controller to the presentation mechanism to cause the presentation mechanism to transport the manufactured part to at least one of a first location and a second location. The first location can be designated for deposit of the manufactured part where a pass determination is rendered and the second location can be designated for deposit of the manufactured part where the fail determination is rendered.

The ordered object detection map of the system according to exemplary embodiments can further comprise at least one of a calibrated order and position associated with each of the predetermined detectable objects. According to such embodiments, the image data can further comprise at least one of a calibrated order and position associated with detectable objects from the visual image.

According to exemplary embodiments presented herein, the system can further include at least one additional cycle of detection of the part wherein fourth and fifth control signals are sent by the programmable logic controller. The forth control signal can be sent to the presentation mechanism to reposition the manufactured part in a reoriented position relative the image capture device. The fifth control signal can be sent by the programable logic controller to the image capture device to actuate the image capture device to capture a new visual image of the part in the reoriented position. The image data can further comprise detectable objects from the new visual image. A pass determination can be rendered where detectable objects from the new visual image correspond to predetermined detectable objects of the ordered object detection map. A fail determination can be rendered where detectable objects from the new visual image fail to correspond to predetermined detectable objects of the ordered object detection map.

The detection of the part in the system further comprises a vision analysis, the vision analysis being carried out separate from the acquisition of the visual image. In the system, the processing circuitry can be remote from the processor and can be configured to interface with the system controller via at least one of a public or private network. In the system, the trained object detection model can be created from a plurality of training images of the manufactured part being acquired and labeled wherein objects of the manufactured part requiring detection can be identified on the plurality of training images by application of a marking around the perimeter of the object and correspondingly labeled to create the label map. In the system, the trained object detection model can be created by removal of misapplied labels from the training images and transformation of the training images into machine-readable training data files formatted for processing by the circuity. In the system, the trained object detection model can be created through execution of a plurality of training runs wherein the circuitry can process image data from a reference image in relation to object data from the training data files to render at least one of a pass determination and a fail determination, whereupon such determination can be evaluated for accuracy to establish an accuracy threshold score for the trained object detection model. In the system, the ordered object detection map can be modified to mask at least one object by the application of reference indicia to at least a portion of the image data input such that objects within the reference indicia are not recognizable upon being processed to render at least one of the pass determination and a fail determination. In the system, the predetermined detectable objects of the ordered object detection map can be featureless wherein the pass determination for the corresponding manufactured part can be rendered from image data comprising featureless detectable objects. The above description references the inspection of molded parts but is not limited to that application alone. For example, this invention can be used to detect defects such as unwanted wrinkles in vehicle seat covers or dents and scratches on metal plates. Other applications include detecting unwanted debris on a conveyor line or assembly machine that can cause machine failures. Furthermore, the system can perform the described operations using multiple cameras and multiple trained AI deep learning models for multiple part types and objects.

From the foregoing, it will be seen that this invention is one well adapted to attain all the ends and objects hereinabove set forth together with other advantages which are inherent to the structure. It will be understood that certain features and sub combinations are of utility and may be employed without reference to other features and sub combinations. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "can include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention.

What is claimed is:

1. A method for object detection for an item of manufacture, the method comprising:

creating object detection map output by executing a trained object detection model on input comprising at least training image data taken from an image of reference items of manufacture and a label map comprising identifications of a plurality of predetermined detectable objects;

generating an ordered object detection map from the object detection map output processed according to predetermined calibration criteria, the ordered object detection map having reference data for the item of manufacture whereby the reference data comprises visually observable features of the item of manufacturer and wherein the visually observable features comprise at least one of visual characteristics of the plurality of predetermined detectable objects, a predetermined order of the plurality of predetermined detectable objects relative to one another, and a predetermined location of the plurality of predetermined detectable objects along the item of manufacture;

storing the ordered object detection map in an electronic memory of a system controller electronically coupled to an image capture device, the system controller further comprising a programmable processor utilizing processing circuitry, a programmable logic controller and input/output circuitry;

holding the item of manufacture in operative relation to the image capture device using a fixture mechanism;

sending a first control signal from the programable logic controller to the fixture mechanism to indicate that the item of manufacture is held by the fixture mechanism in operative relation to the image capture device;

sending a second control signal to from the programable logic controller to the image capture device to actuate the image capture device to capture a visual image of the item of manufacture held by the fixture mechanism;

carrying out a visual inspection of the item of manufacture held by the fixture mechanism, the visual inspection comprising detection of the visually observable features on the item of manufacture;

identifying and processing image data from the visual image, the image data comprising at least one of detectable objects that correspond with the visually observable features, detectable objects that differ from the visually observable features and an absence of detectable objects from the visually observable features;

processing the detectable objects from the visual image in relation to the reference data of the ordered object detection map;

rendering at least one of a pass determination and a fail determination, wherein the pass determination is rendered where detectable objects from the visual image correspond to predetermined detectable objects of the reference data of the ordered object detection map and the fail determination is rendered where detectable objects from the visual image fail to correspond to predetermined detectable objects of the reference data of the ordered object detection map;

sending a third control signal from the programable logic controller to the fixture mechanism to indicate that the item of manufacture held by the fixture mechanism is ready to be transported to at least one of a first location and a second location, the first location being designated for deposit of the item of manufacture held by the fixture mechanism where a pass determination is rendered and the second location being designated for deposit of the item of manufacture held by the fixture mechanism where the fail determination is rendered, and transporting the item of manufacture to at least one of the first location and the second location.

2. The method of claim 1 further comprising:

providing the ordered object detection map with at least one of a calibrated order and position associated with each of the plurality of predetermined detectable objects, and providing the image data with at least one of a calibrated order and position associated with the predetermined detectable objects from the visual image.

3. The method of claim 1 further comprising:

performing at least one additional cycle of detection of the item of manufacture held by the fixture mechanism comprising:

sending a fourth control signal from the programmable logic controller to the fixture mechanism to reposition the item of manufacture held by the fixture mechanism in a reoriented position relative to the image capture device;

repositioning the item of manufacture held by the fixture mechanism in the reoriented position;

sending a fifth control signal from the programmable logic controller to the image capture device to actuate the image capture device to capture a new visual image of the item of manufacture held by the fixture mechanism in the reoriented position;

capturing a new visual image of the item of manufacture held by the fixture mechanism in the reoriented position.

4. The method of claim 3 further comprising:

supplementing the image data with detectable objects from the new visual image;

rendering at least one of a new pass determination and a new fail determination whereby the new pass determination is rendered where detectable objects from the new visual image correspond to predetermined detectable objects of the reference data of the ordered object detection map, and the new fail determination is rendered where detectable objects from the new visual image fail to correspond to predetermined detectable objects of the reference data of the ordered object detection map.

5. The method of claim 1 further comprising carrying out a vision analysis as part of the detection of the item of manufacturer held by the fixture mechanism, the vision analysis being carried out separately from the visual image being captured.

6. The method of claim 1 further comprising modifying the ordered object detection map to mask at least one object of the plurality of detectable objects by applying reference indicia to at least a portion of the training image data such that objects within the reference indicia are not recognizable upon being processed to render at least one of the pass determination and the fail determination.

7. The method of claim 1 further comprising moving the item of manufacture along a conveyor assembly.

8. The method of claim 1 further comprising:

providing a manufacturing machine;

manufacturing at least one part by the manufacturing machine;

moving the at least one part from the manufacturing machine to a location in operative relation to the image capture device.

9. The method of claim 1 further comprising processing the identified image data from the visual image by the programable processor of the system controller and rendering the at least one of the pass determination and the fail determination.

10. The method of claim 1 further comprising processing the identified image data from the visual image by a server in communication with the system controller and rendering the at least one of the pass determination and the fail determination.

* * * * *